(12) United States Patent  
Lu

(10) Patent No.: US 12,022,478 B2  
(45) Date of Patent: Jun. 25, 2024

(54) WIRELESS COMMUNICATION METHOD AND COMMUNICATION DEVICE

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 569 days.

(21) Appl. No.: 17/205,947

(22) Filed: Mar. 18, 2021

(65) Prior Publication Data

US 2021/0212107 A1 Jul. 8, 2021

Related U.S. Application Data

(63) Continuation of application No. PCT/CN2019/082151, filed on Apr. 10, 2019.

(30) Foreign Application Priority Data

Sep. 28, 2018 (WO) ................ PCT/CN2018/108457  
Oct. 31, 2018 (WO) ................ PCT/CN2018/113017  
Jan. 18, 2019 (WO) ................ PCT/CN2019/072421

(51) Int. Cl.
*H04W 72/23* (2023.01)  
*H04L 1/00* (2006.01)  
(Continued)

(52) U.S. Cl.
CPC ........... *H04W 72/23* (2023.01); *H04L 1/0004* (2013.01); *H04L 1/001* (2013.01); *H04L 1/1812* (2013.01); *H04W 72/21* (2023.01)

(58) Field of Classification Search
CPC ... H04W 72/23; H04W 72/21; H04W 72/569; H04W 72/56; H04W 72/53;
(Continued)

(56) References Cited

U.S. PATENT DOCUMENTS 11,291,027 B2 * 3/2022 Lee .................. H04W 72/1268  
11,317,401 B2 * 4/2022 Lee ...................... H04W 72/23  
(Continued)

FOREIGN PATENT DOCUMENTS

CN 106162911 A 11/2016  
CN 108024285 A 5/2018  
(Continued)

OTHER PUBLICATIONS

Examination Report No. 1 for Australian Application No. 2019348581 dated Mar. 10, 2022. 5 pages.
(Continued)

*Primary Examiner* — Hardikkumar D Patel  
(74) *Attorney, Agent, or Firm* — Perkins Coie LLP

(57) ABSTRACT

The implementations of the present disclosure relate to a wireless communication method and a communication device. The method comprises: if a first resource grant and a second resource grant have an overlapping portion, using the second resource grant in the overlapping portion to send or receive data, wherein the first resource grant is a dynamically scheduled resource grant, and the second resource grant is a configured resource grant.

18 Claims, 6 Drawing Sheets

(51) Int. Cl.
*H04L 1/1812* (2023.01)
*H04W 72/21* (2023.01)

(58) Field of Classification Search
CPC ..... H04L 1/0004; H04L 1/001; H04L 1/1812; H04L 1/1822; H04L 1/08; H04L 1/1835; H04L 1/1887; H04L 5/0053
See application file for complete search history.

(56) References Cited

U.S. PATENT DOCUMENTS

| | | | |
|---|---|---|---|
| 2014/0003319 A1* | 1/2014 | Etemad | H04W 72/30 370/312 |
| 2014/0161086 A1 | 6/2014 | Tamura et al. | |
| 2018/0176937 A1 | 6/2018 | Chen et al. | |
| 2018/0302895 A1* | 10/2018 | Akkarakaran | H04L 5/0082 |

FOREIGN PATENT DOCUMENTS

| | | |
|---|---|---|
| CN | 108207032 A | 6/2018 |
| CN | 108243501 A | 7/2018 |
| CN | 108282278 A | 7/2018 |
| CN | 108401302 A | 8/2018 |
| CN | 108521884 A | 9/2018 |
| WO | 2017132849 A1 | 8/2017 |

OTHER PUBLICATIONS

Extended European Search Report for European Application No. 19866488.0 dated Feb. 10, 2022. 10 pages.
MediaTek Inc. "On UL Multiplexing for URLLC" R1-1806813; 3GPP TSG RAN1 WG1 Meeting #93; Busan, South Korea; May 21-25, 2018. 2 pages.
Nokia et al. "Prioritization between dynamic grant and configured grant" R2-1800586; 3GPP TSG-RAN WG2 NR Ad hoc 1801; Vancouver, Canada; Jan. 22-26, 2018. 3 pages.
Vivo "Discussion on handling UL multiplexing of transmissions with different reliability requirements" R1-1801550; 3GPP TSG RAN WG1 Meeting #92; Athens, Greece; Feb. 26-Mar. 2, 2018. 5 pages.
CMCC, "Discussion on handling for UL URLLC and eMBB collision issue", 3GPP TSG RAN WG1 Meeting #92bis R1-1804106, Apr. 20, 2018.
CMCC, "Discussion on handling collision issues of UL URLLC and eMBB", 3GPP TSG RAN WG1 Meeting #93, R1-1806369, May 25, 2018.
International Search Report dated Jun. 28, 2019 cited in PCT/CN2018/108457.
International Search Report dated Jun. 28, 2019 cited in PCT/CN2018/113017.
Institute for Information Industryiii, "Intra-UE UL Multiplexing with Different Reliability Requirements", 3GPP TSG RAN WG1 Meeting #93, R1-1807140, May 25, 2018.
International Search Report dated May 29, 2019 cited in PCT/CN2019/072421.
International Search Report dated Jul. 1, 2019 cited in PCT/CN2019/082151.
"Medium Access Control (MAC) protocol specification (Release 15)", 3GPP TS 38.321 V15.3.0 (Sep. 2018).
"Radio Resource Control (RRC) protocol specification (Release 15)", 3GPP TS 38.331 V15.4.0 (Dec. 2018).
Examination Report No. 2 for Australian Application No. 2019348581 dated Sep. 7, 2022. 5 pages.
First Office Action for Chinese Application No. 202110479851.9 dated Jun. 29, 2022. 22 pages with English translation.
Examination Report for European Application No. 19866488.0 dated Oct. 25, 2022. 6 pages.
Second Office Action for Chinese Application No. 202110479851.9 dated Dec. 5, 2022. 17 pages with English translation.
Decision of Rejection for Chinese Application No. 202110479851.9 dated Mar. 16, 2023. 16 pages with English translation.
Examination Report for European Application No. 19866488.0 dated Mar. 14, 2023. 5 pages.
Examination Report of the European application No. 19866488.0, dated Aug. 22, 2023. 6 pages.

* cited by examiner

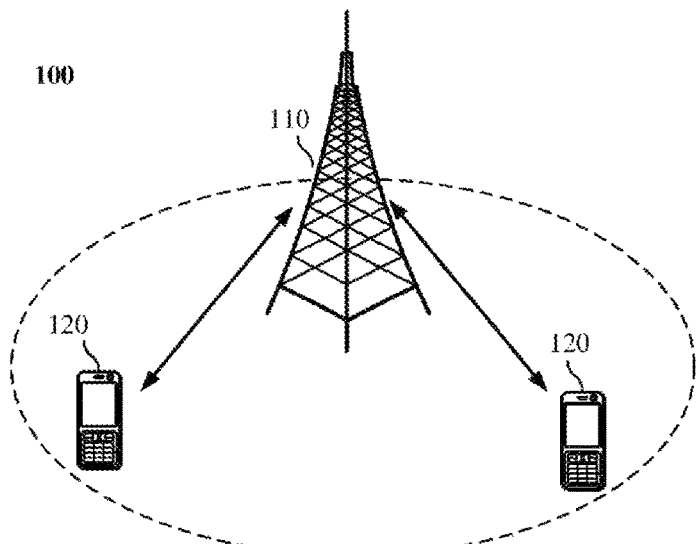

| If there is an overlapping section between a first resource grant and a second resource grant, transmit or receive data in the overlapping section using the second resource grant; wherein the first resource grant is a dynamic scheduling resource grant, and the second resource grant is a configured resource grant | ⟵ 210 |

| In case that a first service is contained in a logical channel to be transmitted and a configurated grant timer corresponding to a second service with a priority lower than that of the first service is running, flip a new data indication (NDI) and transmit or receive data of the first service on a resource grant, wherein the first service and the second service correspond to the same HARQ process | ⟵ 310 |

FIG. 3

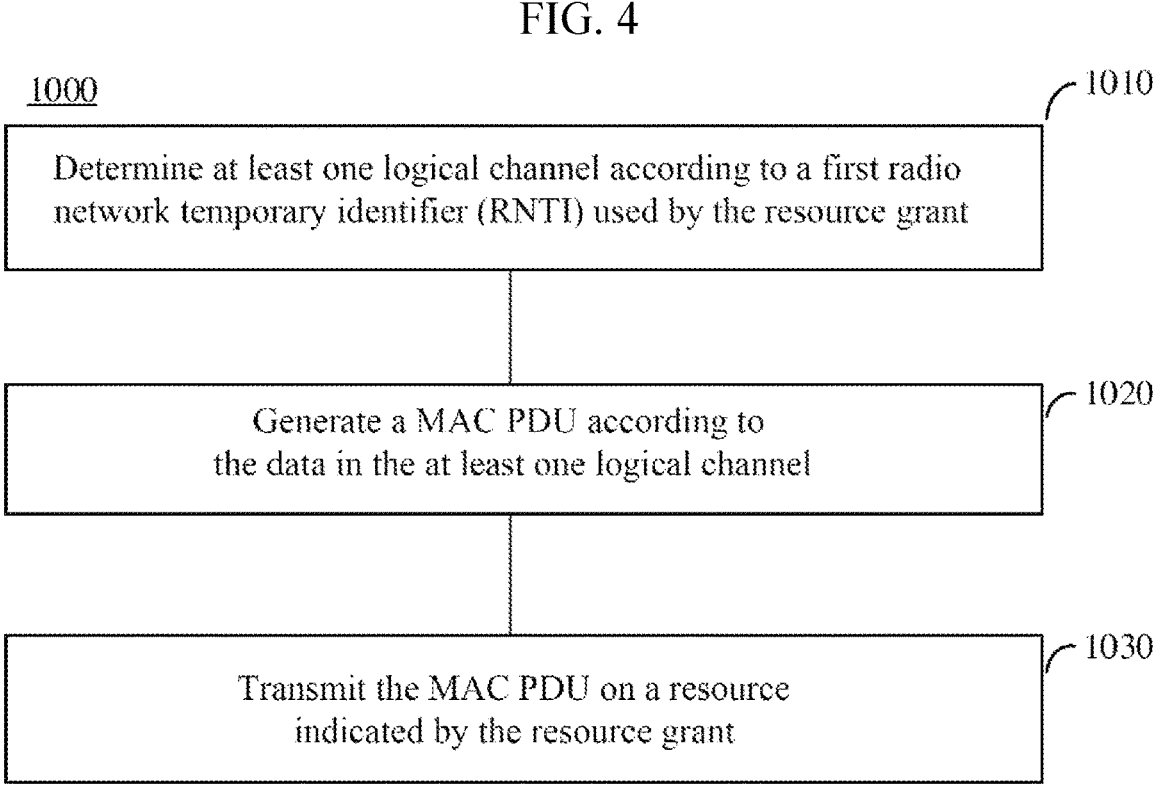
FIG. 4
FIG. 5
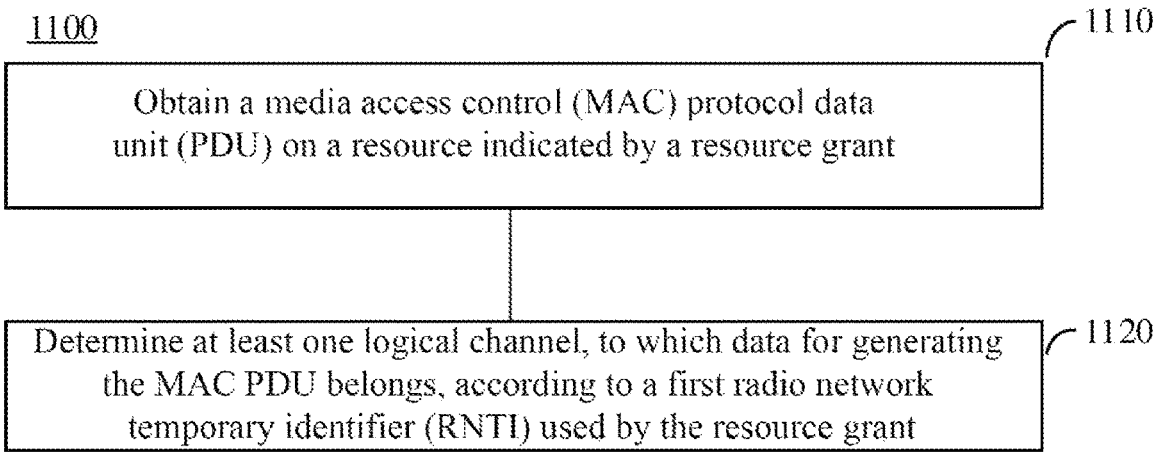
FIG. 6

WIRELESS COMMUNICATION METHOD AND COMMUNICATION DEVICE

CROSS-REFERENCE TO RELATED APPLICATIONS

This application is a continuation application of International PCT Application No. PCT/CN2019/082151 filed on Apr. 10, 2019, which claims the priority to International PCT Application No. PCT/CN2018/108457 filed on Sep. 28, 2018, the priority to International PCT Application No. PCT/CN2018/113017 filed on Oct. 31, 2018, and the priority to International PCT Application No. PCT/CN2019/072421 filed on Jan. 18, 2019, and the entire contents of all the applications are hereby incorporated by reference.

TECHNICAL FIELD

The present disclosure relates to the field of communications, and in particular to wireless communication methods and communication devices.

BACKGROUND

In New Radio (NR) systems, services may be divided into multiple categories, such as enhanced Mobile Broadband (eMBB) services, mass Machine Type Communication (mMTC) services, and Ultra Reliable & Low latency communication (uRLLC) services.

Since among them there are some services (e.g., URLLC services) with higher priorities, how to ensure transmission of services with higher priorities is a problem to be solved urgently.

SUMMARY

Implementations of the present disclosure provide wireless communication methods and communication devices.

In a first aspect, there is provided a wireless communication method including: if there is an overlapping section between a first resource grant and a second resource grant, transmitting or receiving data in the overlapping section using the second resource grant;

wherein the first resource grant is a dynamic scheduling resource grant, and the second resource grant is a configured resource grant.

In a second aspect, there is provided a wireless communication method including: in a case that a first service is contained in a logical channel to be transmitted and a configured grant timer corresponding to a second service with priority lower than that of the first service is running, flipping a new data indication (NDI) and transmitting or receiving data of the first service on a resource grant, wherein the first service and the second service correspond to the same HARQ process.

In a third aspect, there is provided a wireless communication method including: in a case that there is a first service preset to be transmitted using a first resource grant and a second resource grant exists, transmitting or receiving the first service using the second resource grant;

wherein the first resource grant is a dynamic scheduling resource grant, and the second resource grant is a configured resource grant.

In a fourth aspect, there is provided a wireless communication method including: determining at least one logical channel according to a first radio network temporary identifier (RNTI) used by a resource grant; generating a media access control (MAC) protocol data unit (PDU) according to data in the at least one logical channel; and sending the MAC PDU on a resource indicated by the resource grant.

In a fifth aspect, there is provided a wireless communication method including: obtaining a media access control (MAC) protocol data unit (PDU) on a resource indicated by a resource grant; and determining at least one logical channel, to which data generating the MAC PDU belongs, according to a first radio network temporary identifier (RNTI) used by the resource grant.

In a sixth aspect, there is provided a wireless communication method including: generating a first MAC PDU for a first resource grant; generating a second MAC PDU for a second resource grant, wherein there is an overlapping section between the first resource grant and the second resource grant.

In a seventh aspect, there is provided a wireless communication method including: if there is an overlapping section between the first resource grant and the second resource grant, generating a MAC PDU for one of a first resource grant and a second resource grant.

In an eighth aspect, there is provided a communication device used for executing the method according to the first aspect described above.

Specifically, the communication device includes function modules used for executing the method according to the first aspect described above.

In a ninth aspect, there is provided a communication device used for executing the method according to the second aspect described above.

Specifically, the communication device includes function modules used for executing the method according to the second aspect described above.

In a tenth aspect, there is provided a communication device used for executing the method according to the third aspect described above.

Specifically, the communication device includes function modules used for executing the method according to the third aspect described above.

In an eleventh aspect, there is provided a communication device used for executing the method according to the fourth aspect described above.

Specifically, the communication device includes function modules used for executing the method according to the fourth aspect described above.

In a twelfth aspect, there is provided a communication device used for executing the method according to the fifth aspect described above.

Specifically, the communication device includes function modules used for executing the method according to the fifth aspect described above.

In a thirteenth aspect, there is provided a communication device used for executing the method according to the sixth aspect described above.

Specifically, the communication device includes function modules used for executing the method according to the sixth aspect described above.

In a fourteenth aspect, there is provided a communication device used for executing the method according to the seventh aspect described above.

Specifically, the communication device includes function modules used for executing the method according to the seventh aspect described above.

In a fifteenth aspect, there is provided a wireless communication device including a processor and a memory. The memory is used for storing a computer program, and the processor is used for calling and running the computer program stored in the memory to execute the method according to the first aspect described above.

In a sixteenth aspect, there is provided a wireless communication device including a processor and a memory. The memory is used for storing a computer program, and the processor is used for calling and running the computer program stored in the memory to execute the method according to the second aspect described above.

In a seventeenth aspect, there is provided a wireless communication device including a processor and a memory. The memory is used for storing a computer program, and the processor is used for calling and running the computer program stored in the memory to execute the method according to the third aspect described above.

In an eighteenth aspect, there is provided a wireless communication device including a processor and a memory. The memory is used for storing a computer program, and the processor is used for calling and running the computer program stored in the memory to execute the method according to the fourth aspect described above.

In a nineteenth aspect, there is provided a wireless communication device including a processor and a memory. The memory is used for storing a computer program, and the processor is used for calling and running the computer program stored in the memory to execute the method according to the fifth aspect described above.

In a twentieth aspect, there is provided a wireless communication device including a processor and a memory. The memory is used for storing a computer program, and the processor is used for calling and running the computer program stored in the memory to execute the method according to the sixth aspect described above.

In a twenty-first aspect, there is provided a wireless communication device including a processor and a memory. The memory is used for storing a computer program, and the processor is used for calling and running the computer program stored in the memory to execute the method according to the seventh aspect described above.

In a twenty-second aspect, there is provided a chip for implementing the method according to any one of the first to seventh aspects described above.

Specifically, the chip includes a processor for calling and running a computer program from a memory, so that a device having the chip installed thereon executes the method according to any one of the first to seventh aspects described above.

In a twenty-third aspect, there is provided a computer readable storage medium for storing a computer program that causes a computer to execute the method according to any one of the first to seventh aspects described above.

In a twenty-fourth aspect, there is provided a computer program product including computer program instructions that cause a computer to execute the method according to any one of the first to seventh aspects described above.

In a twenty-fifth aspect, there is provided a computer program, which, when running on a computer, causes the computer to execute the method according to any one of the first to seventh aspects described above.

BRIEF DESCRIPTION OF DRAWINGS

FIG. 1 is a schematic diagram of a architecture of a communication system according to an implementation of the present disclosure.

FIG. 2 is a schematic flow chart of a wireless communication method according to an implementation of the present disclosure.

FIG. 3 is a schematic flow chart of a wireless communication method according to an implementation of the present disclosure.

FIG. 4 is a schematic flow chart of a wireless communication method according to an implementation of the present disclosure.

FIG. 5 is a schematic flow chart of a wireless communication method according to an implementation of the present disclosure.

FIG. 6 is a schematic flow chart of a wireless communication method according to an implementation of the present disclosure.

DETAILED DESCRIPTION

Figure 7:
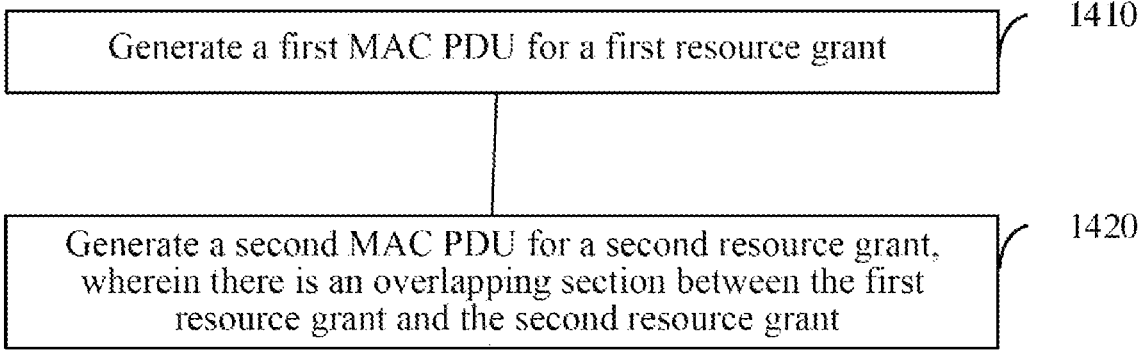
FIG. 7 is a schematic flow chart of a wireless communication method according to an implementation of the present disclosure.

Technical solutions in implementations of the present disclosure will be described below with reference to the drawings in the implementations of the present disclosure. It is apparent that the implementations described are just some of the implementations of the present disclosure, but not all of the implementations of the present disclosure. Based on the implementations of the present disclosure, all other implementations achieved by a person of ordinary skill in the art without paying inventive efforts are within the protection scope of the present disclosure.

The technical solutions in the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, a LTE Time Division Duplex (TDD) system, a Universal Mobile Telecommunications System (UMTS), a Worldwide Interoperability for Microwave Access (WiMAX) communication system or a 5G system, etc.

Illustratively, a communication system 100 applied in an implementation of the present disclosure is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The wireless communication system 100 further includes at least one terminal 120 located within the coverage range of the network device 110. The "terminal device" as used herein includes, but not limited to, a device configured to be connected via a wired circuit, for example, via a public switched telephone network (PSTN), a digital subscriber line (DSL), a digital cable, a direct cable; and/or another data connection/network; and/or via a wireless interface, for instance, for a cellular network, a wireless local area network (WLAN), a digital television network such as a handheld digital video broadcasting-handheld (DVB-H) network, a satellite network, and an amplitude modulation—frequency modulation (AM-FM) broadcast transmitter; and/or an apparatus of another terminal configured to receive/transmit communication signals; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular phone; a personal communication system (PCS) terminal capable of combining a cellular radio phone with data processing, faxing, and data communication capabilities; a personal digital assistant (PDA) that may include a radio phone, a pager, internet/intranet access, a Web browser, a memo pad, a calendar, a Global Positioning System (GPS) receiver; and a conventional laptop and/or palmtop receiver or other electronic devices including a radio phone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), etc.

Optionally, a device to device (D2D) communication may be performed between the terminal devices 120.

Optionally, the 5G system or 5G network may be referred to as a New Radio (NR) system or a NR network.

FIG. 1 exemplarily illustrates one network device and two terminal devices. Optionally, the communication system 100 may include multiple network devices, and other numbers of terminal devices may be included within the coverage range of each network device, which is not limited in the implementations of the present disclosure.

Optionally, the communication system 100 may include other network entities, such as a network controller and a mobile management entity, which is not limited in the implementations of the present disclosure.

It should be understood that a device with a communication function in a network/system in the implementations of the present disclosure may be referred to as a communication device. Taking the communication system 100 shown in FIG. 1 as an example, the communication device may include a network device 110 and terminal devices 120 which have communication functions, and the network device 110 and the terminal devices 120 may be the specific devices described above, and will not be described repeatedly herein. The communication device may also include other devices in the communication system 100, such as other network entities, such as network controllers and mobile management entities, which are not limited in the implementations of the present disclosure.

FIG. 2 is a schematic flow chart of a wireless communication method 200 according to an implementation of the present disclosure. The method 200 includes at least part of the following contents. The method 200 may be performed by a communication device, such as a network device or a terminal device.

Optionally, the implementation of the present disclosure may be used for uplink data transmission or downlink data transmission. If the implementation of the present disclosure is used for downlink data transmission, the communication device implementing the implementation of the present disclosure may be a terminal device serving as a receiving end, or may be a network device serving as a transmitting end. If the implementation of the present disclosure is used for uplink data transmission, the communication device implementing the implementation of the present disclosure may be a network device serving as a receiving end, or may be a terminal device serving as a transmitting end.

In 210, if there is an overlapping section between a first resource grant and a second resource grant, data is transmitted or received in the overlapping section using the second resource grant;

wherein the first resource grant is a dynamic scheduling resource grant, and the second resource grant is a configured resource grant.

Specifically, in a case that there is an overlapping section between the dynamic scheduling first resource grant and the configured second resource grant, the data may be transmitted or received in the overlapping section using the second resource grant, and the data will no longer be transmitted or received in the overlapping section any more using the first resource grant, thereby ensuring the use of the configured resource grant, such that transmission of services transmitted on the second resource grant can be ensured.

Optionally, in an implementation of the present disclosure, when there is data preset to be transmitted or received using the second resource grant, the data preset to be transmitted or received using the second resource grant will be transmitted or received using the second resource grant. If there is no data preset to be transmitted or received using the second resource grant, other data, such as data that can be dynamically scheduled on the first resource grant, can be transmitted.

Optionally, in an implementation of the present disclosure, if the data is transmitted using the second resource grant in the overlapping section, the first resource grant may be discarded, specifically, no data transmission will be performed in other non-overlapping sections, which may be specifically understood as that if there is an overlapping section between the first resource grant and the second resource grant, the data will be transmitted or received using the second resource grant, and the first resource grant will be discarded.

Or, in an implementation of the present disclosure, services corresponding to the first resource grant are transmitted or received using resources which are in a section where the first resource grant does not overlap with the second resource grant, or other services may be transmitted. Specifically, it may be understood that if there is the overlapping section between the first resource grant and the second resource grant, the data will be transmitted or received using the second resource grant, and for the first resource grant, the data may be transmitted in the non-overlapping resource sections.

Optionally, in an implementation of the present disclosure, a Hybrid Automatic Repeat reQuest (HARQ) process corresponding to the first resource grant is the same as or different from a HARQ process corresponding to the second resource grant.

Optionally, in an implementation of the present disclosure, the configured resource grant may be a grant-free resource, that is, the resource grant does not need to be dynamically scheduled. The configured resource grant may optionally be a periodic resource grant.

The resource grant mentioned in the implementation of the present disclosure may be an uplink resource grant, which is used for uplink data transmission at this time, or may be a downlink resource grant, which may be used for downlink data transmission at this time.

Optionally, in an implementation of the present disclosure, the first resource grant is scrambled by a Cell Radio Network Temporary Identifier (C-RNTI), a Temporary C-RNTI (TC-RNTI) or a Configured Scheduling RNTI (CS-RNTI); or, the first resource grant is carried in a random access response.

Optionally, in an implementation of the present disclosure, that there is an overlapping section between the first resource grant and the second resource grant may mean that there is an overlapping section between the first resource grant and the second resource grant in the time domain, and the overlapping section is an overlapping section in the time domain. Or that there is an overlapping section between the first resource grant and the second resource grant may mean that there is an overlapping section between the first resource grant and the second resource grant in the frequency domain, and the overlapping section is an overlapping section in the frequency domain. That there is an overlapping section between the first resource grant and the second resource grant may mean that there is an overlapping section between the first resource grant and the second resource grant in the time-frequency domain (i.e., an overlapping section in both the time domain and the frequency domain), and the overlapping section is an overlapping section in the time-frequency domain.

Optionally, in an implementation of the present disclosure, if there is the overlapping section between the first resource grant and the second resource grant, and in a case that a preset condition is met, the data is transmitted or received in the overlapping section using the second resource grant.

Specifically, in the case that that the preset condition is met, data is transmitted or received in the overlapping section using the second resource grant, and if the preset condition is not met, the data may be transmitted or received in the overlapping section using the first resource grant.

It should be understood that the implementation of the present disclosure may not limit any condition, that is, as long as there is an overlapping section between the first resource grant and the second resource grant, the data is transmitted in the overlapping section using the second resource grant.

The preset condition will be described in detail below.

Optionally, in an implementation of the present disclosure, the preset condition includes at least one of:

a first condition about an attribute of the second resource grant, a second condition for that a logical channel to be transmitted meets the second resource grant, a third condition for that the second resource grant is used for retransmission or initial transmission, a fourth condition about a configured grant timer for a hybrid automatic repeat request (HARQ) process of the second resource grant, a fifth condition for that the first resource grant is used for retransmission or initial transmission, a sixth condition about an attribute of the logical channel, and a seventh condition about service data existing in an MAC PDU in the hybrid automatic repeat request (HARQ) process of the second resource grant.

Any one, any two, any three, any four, any five, any six, or any seven of the above-mentioned conditions may be selected as the preset condition(s) in the implementation of the present disclosure.

The preset condition may be preset on the terminal device based on a protocol, or may be preconfigured for the terminal device by the network device, for example, the preset condition may be configured through a Radio Resource Control (RRC) signaling.

Optionally, in an implementation of the present disclosure, the first condition may be a condition about at least one of: a subcarrier spacing of the second resource grant, transmission duration of a physical shared channel of the second resource grant, a type of the second resource grant, a serving cell applied by the second resource grant, a Modulation and Coding Scheme (MCS) table applied by the second resource grant, an MCS table applied by the second resource grant for transmission precoding, Uplink Control Information (UCI) applied by the second resource grant for transmission of a physical shared channel (which may be a physical uplink shared channel or a physical downlink shared channel), the number of times of repeated transmission applied by the second resource grant, a redundant transmission version number of repeated transmission applied by the second resource grant, a transmission period applied by the second resource grant, a configured grant timer applied by the second resource grant, a modulation order, code rate and corresponding transport block size applied by the second resource grant, a parameter of a configuration grant applied by the second resource grant, Semi-Persistent Scheduling (SPS) configuration applied by the second resource grant, indication information applied by the second resource grant, logical channel priority limit of the second resource grant, a priority of logical channels applied by the second resource grant, a priority of the second resource grant, and an identifier of the second resource grant.

Optionally, in an implementation of the present disclosure, the first condition includes at least one of:
- that the subcarrier spacing of the second resource grant meets a set subcarrier spacing list;
- that the transmission duration of the physical shared channel of the second resource grant meets a set allowed maximum transmission duration of the physical shared channel;
- that the type of the second resource grant is a specific type;
- that the serving cell applied by the second resource grant is an allowed serving cell for transmission;
- that the Modulation and Coding Scheme (MC S) table applied by the second resource grant meets a set MCS table list;
- that the MCS table applied by the second resource grant for transmission precoding meets a set MCS table list;
- that the uplink control information (UCI) applied by the second resource grant for transmission on the physical shared channel (which may be a physical uplink shared channel or a physical downlink shared channel) meets a set condition;
- that the number of times of repeated transmission applied by the second resource grant meets a set condition;
- that a redundant transmission version number of repeated transmission applied by the second resource grant meets a set condition;
- that a transmission period applied by the second resource grant meets a set condition;
- that a configured grant timer applied by the second resource grant meets a set condition;
- that a modulation order, code rate and corresponding transmission block size applied by the second resource grant meet a certain condition;
- that a parameter of the configuration grant applied by the second resource grant meets a set condition;
- that semi-persistent scheduling (SPS) configuration applied by the second resource grant meets a set condition;
- that indication information applied by the second resource grant is indication information for a ultra reliable & low latency communication (URLLC) service;
- that a logical channel priority limit of the second resource grant matches with a specific service or a specific logical channel;
- that a priority of the logical channel applied by the second resource grant matches with a specific service or a specific logical channel; and
- that the second resource grant is a resource grant with a specific priority or a resource grant with a specific identifier.

In the above, the logical channel priority (LCP) limit mentioned in the implementation of the present disclosure may be a limitation on a LCP parameter of the second resource grant, specifically, a value of the LCP parameter is limited.

In the above, the LCP parameter may include at least one of: a subcarrier spacing usable by the logical channel; transmission duration of a physical shared channel usable by the logical channel; a type of a resource usable by the logical channel; a serving cell applicable by the logical channel; an MCS table usable by the logical channel; an MCS table usable by the logical channels for transmission precoding; UCI usable by the logical channel for transmission of physical shared channel; the number of times of repeated transmission usable by the logical channel; a redundant transmission version number of repeated transmission usable by the logical channel; a transmission period usable by the logical channel; a configured grant timer usable by the logical channel; a modulation order, code rate and corresponding transmission block size usable by the logical channel; a parameter of configuration grant usable by the logical channel; SPS configuration usable by the logical channel; service information that can be transmitted by the logical channel.

Optionally, that the logical channel priority limit of the second resource grant matches with the specific service or the specific logical channel may mean that a LCP parameter limited on the second resource grant is applicable to the specific service or the specific logical channel, that is, the specific service or logical channel can be transmitted using the second resource grant.

Optionally, that the priority of the logical channel applied by the second resource grant matches with the specific service or the specific logical channel may mean that the priority of the logical channel applied by the second resource grant meets the specific service's requirement on the priority of the logical channel/a logical channel group, or the priority of the logical channel applied by the second resource grant is the priority the logical channel/logical channel group, or the priority of the logical channel applied by the second resource grant meets or contains the priority of the specific service or the specific logical channel/logical channel group. For example, a matching of identifiers of logical channels/logical channel groups, a matching of values of priority of the logical channels/logical channel groups, etc.

Optionally, the second resource grant is a resource grant with specific priority or a resource grant with a specific identifier, wherein the specific identifier may refer to at least one of: identification information, preference indication, preemption indication, priority indication, number indication, etc.

Optionally, in an implementation of the present disclosure, the second condition is a condition about at least one of: a subcarrier spacing usable by the logical channel, transmission duration of a physical shared channel usable by the logical channel, a type of resource usable by the logical channel, a serving cell applicable by the logical channel, an indication identifier of the logical channel, a MCS table usable by the logical channel, an MCS table usable by the logical channel for transmission precoding, uplink control information (UCI) usable by the logical channel for transmission of a physical shared channel, the number of times of repeated transmission usable by the logical channel, a redundant transmission version number of repeated transmission usable by the logical channel, a transmission period usable by the logical channel, a configured grant timer usable by the logical channel, a modulation order, code rate and corresponding transport block size usable by the logical channel, a parameter of configuration grant usable by the logical channel, and SPS configuration usable by the logical channel. Optionally, in an implementation of the present disclosure, the second condition includes at least one of:
- that the subcarrier spacing usable by the logical channel belongs to a subcarrier spacing list, which corresponds to the second resource grant;
- that the transmission duration of the physical shared channel usable by the logical channel meets an allowed maximum transmission duration of the physical shared channel, wherein the allowed maximum transmission duration corresponds to the second resource grant;

that the type of the resource usable by the logical channel conforms to a specific type, wherein the specific type corresponds to the second resource grant;

that the serving cell usable by the logical channel conforms to an allowed serving cell for transmission, wherein the allowed serving cell for transmission corresponds to the second resource grant;

that the logical channel carries an indication identifier containing a specific service, which is a service for the second resource grant;

that the MCS table usable by the logical channel meets a set MCS table list, which corresponds to the second resource grant;

that the MCS table usable by the logical channel for transmission precoding meets a set MCS table list, which corresponds to the second resource grant;

that the uplink control information (UCI) usable by the logical channel for transmission of physical shared channel meets a set condition, which corresponds to the second resource grant;

that the number of times of repeated transmission usable by the logical channel meets a set condition, which corresponds to the second resource grant;

that the redundant transmission version number of repeated transmission usable by the logical channel meets a set condition, which corresponds to the second resource grant;

that the transmission period usable by the logical channel meets a set condition, which corresponds to the second resource grant;

that the configured grant timer usable by the logical channel meets a set condition, which corresponds to the second resource grant;

that the modulation order, code rate and corresponding transmission block size usable by the logical channel meet a set condition, which corresponds to the second resource grant;

that the parameter of the configuration grant usable by the logical channel meets a set condition, which corresponds to the second resource grant; and that the SPS configuration usable by the logical channel meets a set condition, which corresponds to the second resource grant.

Optionally, the third condition is a condition about whether the second resource grant is used for retransmission.

Optionally, in an implementation of the present disclosure, the third condition includes that the second resource grant is used for retransmission.

Optionally, the fourth condition is a condition about the configured grant timer for the HARQ process of the second grant resource.

Optionally, in an implementation of the present disclosure, the fourth condition includes that the configured grant timer for the HARQ process of the second grant resource is running.

Optionally, the fifth condition is a condition for that the first resource grant is used for initial transmission or retransmission.

Optionally, in the implementation of the present disclosure, the fifth condition includes that the first resource grant is used for initial transmission or retransmission.

In the above, whether the first resource grant is used for initial transmission may be determined by the following conditions. If any one of the following conditions is met, the first resource grant is used for initial transmission:

if a received grant does not correspond to a physical downlink control channel (PDCCH) scrambled using a TC-RNTI, and compared with the previous transmission with respect to the current block of the HARQ process, a New Data Indication (NDI) provided in the associated HARQ information has been flipped;

if the resource grant is received on the PDCCH used for the C-RNTI and a HARQ buffer for the identified process is empty;

if the resource grant is received in the random access response; and if the resource grant is part of multiple configured resource grants and can be used for transmission, and no Media Access Control (MAC) Protocol Data Unit (PDU) has been obtained from the multiple configured resource grants.

Optionally, the sixth condition is a condition about at least one of: a service indication identifier of the logical channel, a logical channel identifier of the logical channel, an identifier of a logical channel group to which the logical channel belongs, a priority of the logical channel, a priority of the logical channel group to which the logical channel belongs, a service to be transmitted of the logical channel, and a service to be transmitted of the logical channel group to which the logical channel belongs.

Optionally, in an implementation of the present disclosure, the sixth condition includes at least one of: that the logical channel carries an indication identifier containing a specific service; that the logical channel is configured to carry a logical channel identifier (ID) of a specific service; that the priority of the logical channel is a specific priority; that a priority of the logical channel group to which the logical channel belongs is a specific priority; that an identifier of the logical channel group to which the logical channel belongs is a specific identifier; that the logical channel has a service to be transmitted; that the logical channel group to which the logical channel belongs has a service to be transmitted; that the logical channel has a specific service to be transmitted; that the logical channel group to which the logical channel belongs has a specific service to be transmitted.

In the above, the specific priority may be a priority corresponding to URLLC, IIoT and high reliability and low latency services. The specific priority may be a higher priority (a priority higher than a priority of certain services (e.g., eMbb services)) or a lower priority (a priority lower than a priority of certain services (e.g., URLLC services)). The specific priority may be a priority with a higher priority identifier or a priority with a lower priority identifier. The specific priority may be a priority whose priority identifier has a specific value or is in a specific value range.

Similarly, the specific identifier mentioned in the implementation of the present disclosure may include multiple identifiers, and the logical channel or the logical channel group having the specific identifier may mean that the identifier of the logical channel or the logical channel group includes at least one of the multiple specific identifiers.

The specific service may also include multiple services. The logical channel having the specific service to be transmitted means that the service to be transmitted that the logical channels have may include at least one of multiple specific services, or all the services to be transmitted that the logical channel have belong to the specific services.

Optionally, the logical channel mentioned in the implementation of the present disclosure may be a logical channel carried on an uplink resource, that is, the logical channel or its data has been sent. For example, the logical channel may be a logical channel carried on the uplink resource in the logical channel of the specific service.

Of course, the logical channel in the implementation of the present disclosure may also be a logical channel that is not carried on an uplink resource, that is, the logical channel or its data has not been sent, or the logical channel or its data is not to be transmitted. Or the logical channel in the implementation of the present disclosure may include a logical channel or its data carried on an uplink resource and a logical channel or its data not carried on an uplink resource.

The specific service may be a URLLC service or a service with a higher reliability and lower latency than services transmitted by the first resource grant.

In the above, under the sixth condition, even if the specific service is a dynamically scheduled service, it may be transmitted by the second resource grant. Optionally, in an implementation of the present disclosure, the seventh condition includes that a MAC PDU in the HARQ process for the second resource grant contains a specific service or contains data corresponding to a specific logical channel ID.

In the implementation of the present disclosure, any one of specific services mentioned above may be URLLC service, Industrial Internet of Things (IIoT) service, or service with higher reliability and lower latency than services transmitted by the first resource grant.

Optionally, in an implementation of the present disclosure, the type of the service used by the first resource grant for transmission may be the same as or different from that of the service used by the second resource grant for transmission. The services used for transmission mentioned herein may refer to services preset to be used for transmission or services dynamically scheduled to be used for transmission.

In an implementation mode, the first resource grant is used for transmitting or receiving Enhance Mobile Broadband (eMBB) services, and the second resource grant is used for transmitting or receiving URLLC services.

In an implementation mode, the first resource grant is used for transmitting or receiving retransmitted data of the URLLC services with low priority, and the second resource grant is used for transmitting or receiving initially transmitted data of the URLLC services with high priority.

In an implementation mode, the first resource grant is used for transmitting or receive retransmitted data of semi-statically transmitted services (voice services with low priority), and the second resource grant is used for transmitting or receive initially transmitted data of the URLLC services.

Optionally, in an implementation of the present disclosure, in a case that the logical channel to be transmitted contains the a first service and the configured grant timer of the HARQ process corresponding to the second service which has a priority lower than that of the first service is running, the new data indication (NDI) is flipped and data of the first service is transmitted or received on the second resource grant, wherein the first service and the second service correspond to the same HARQ process.

In order to understand the present disclosure more clearly, the present disclosure will be described with reference to several specific implementations. It should be understood that although the following implementations are set forth separately, mutual references may be made to these implementations without conflict.

Implementation 1 When the first resource grant corresponding to the PDCCH scrambled by C-RNTI is received, at this time there is a second resource grant used for grant-free and configured for URLLC services, and HARQ process numbers configured correspondingly to the first resource grant and the second resource grant are the same. If a buffer carrying URLLC data is not empty at this time, the URLLC data is transmitted preferentially using the configured second resource grant, and the first resource grant may be discarded.

Further, the URLLC services may be grouped according to QoS levels, and different processing priorities may be configured. If the cache carrying the URLLC data is not empty and carries data with higher priority at this time, no matter whether the configured grant timer for a low priority service is still running, the NDI is considered to be flipped, and the configured grant timer is started or restarted to inform a HARQ entity of the second resource grant and associated HARQ information.

Or, if the configured grant timer for the low priority service is still running, no operation is performed; if the configured grant timer is not running, it may be considered that the NDI is flipped, and the configured grant timer is started or restarted to inform a HARQ entity of the second resource grant and associated HARQ information.

Implementation 2

It is assumed that the first resource grant is obtained through a Random Access Response (RAR), there is a second resource grant (e.g., uplink grant) used for grant-free configured for URLLC services at this time, and HARQ process numbers correspondingly configured to the first resource grant and the second resource grant are the same or different, if a buffer carrying URLLC data is not empty and there is a MAC PDU in an Msg3 buffer, the MAC PDU is obtained from the msg3 buffer and transmitted using the first resource grant.

Or, it is assumed that that the first resource grant is obtained through a Random Access Response (RAR), there is a second resource grant (e.g., uplink grant) used for grant-free and configured for the URLLC services at this time, and HARQ process numbers configured corresponding to the first resource grant and the second resource grant are the same, if a buffer carrying URLLC data is not empty and there is a MAC PDU in an Msg3 buffer, the MAC PDU (containing the URLLC data) is obtained from a Multiplexing and assembly entity, and is transmitted using the first resource grant, and the URLLC services are preferentially transmitted.

Or, it is assumed that the first resource grant is obtained through a Random Access Response (RAR), there is a second resource grant (e.g., uplink grant) for ised grant-free and configured for URLLC services at this time, and HARQ process numbers correspondingly configured to the first resource grant and the second resource grant are the same, if a buffer carrying URLLC data is not empty and there is no MAC PDU in an Msg3 buffer, the MAC PDU (containing the URLLC data) is obtained from a Multiplexing and assembly entity, the URLLC services are preferentially transmitted using resources of the second resource grant, and the first resource grant is discarded.

Further, the URLLC services may be grouped according to Quality of Service (QoS) levels, and different processing priorities may be configured. If the cache carrying the URLLC data is not empty and carries data with higher priority at this time, no matter whether the configured grant timer for low priority services is still running, the NDI is considered to be flipped, and the configured grant timer is started or restarted to inform a HARQ entity of the second resource grant and associated HARQ information.

Or, if the configured grant timer for the low priority services is still running, no operation is performed; if the configured grant timer is not running, it may be considered that the NDI is flipped, and the configured grant timer is started or restarted to inform a HARQ entity of the second resource grant and associated HARQ information.

Implementation 3

When the first resource grant (which may be used for msg3 retransmission) corresponding to the PDCCH scrambled by a TC-RNTI is received, there is a second resource grant (e.g., uplink grant) used for grant-free and configured for URLLC services at this time, and HARQ process numbers configured corresponding to the first resource grant and the second resource grant are the same or different. If a buffer carrying URLLC data is not empty at this time, the URLLC data is preferentially transmitted using the second resource grant and the first resource grant is discarded.

Further, the URLLC services may be grouped according to QoS levels, and different processing priorities may be configured. If the cache carrying the URLLC data is not empty and carries data with higher priority at this time, no matter whether the configured grant timer for low priority services is still running, the NDI is considered to be flipped, and the configured grant timer is started or restarted to inform a HARQ entity of the second resource grant and associated HARQ information.

Or, if the configured grant timer for the low priority services is still running, no operation is performed; if the configured grant timer is not running, it may be considered that the NDI to be flipped, and the configured grant timer is started or restarted to inform a HARQ entity of the second resource grant and associated HARQ information.

Implementation 4

When a first uplink grant corresponding to the PDCCH scrambled by CS-RNTI is received, and a HARQ buffer is not empty at this time (there is retransmission to be transmitted, for example, retransmission data of URLLC services), there is a second resource grant configured for the URLLC services at this time, and HARQ process numbers corresponding to the first resource grant and the second resource grant are the same, if a buffer carrying the newly transmitted data of URLLC is not empty at this time, the data may be retransmitted using the first resource grant, or the newly transmitted data, may be transmitted using the first resource grant or the second resource grant, wherein the newly transmitted data is URLLC data with higher priority (compared with the retransmission data) grouped and configured according requirements such as QoS.

Implementation 5

If there is no data to be transmitted in a URLLC data cache, if meanwhile there is an uplink resource of the first resource grant at this time, the second resource grant may be discarded and the data may be transmitted using the first resource grant.

Or, if there is no data to be transmitted in the URLLC data cache, if there is no uplink resource of the first resource grant at this time, the data will be transmitted using the second resource grant. Further, the configured grant timer may not be started or restarted. Or, the network device may be configured to use a logical channel corresponding to an eMBB service of the resource for performing transmission using the second resource grant.

Implementation 6

When the first resource grant corresponding to the PDCCH scrambled by C-RNTI, TC-RNTI or CS-RNTI is received, there is a second resource grant (e.g., downlink grant) used for grant-free (configured in SPS configuration) and configured for URLLC services at this time, and HARQ process numbers correspondingly configured to the first resource grant and the second resource grant are the same or different, if a buffer carrying URLLC data is not empty at this time, the URLLC data is transmitted preferentially using the second resource grant, and the first resource grant is discarded.

Therefore, in the implementation of the present disclosure, if there is an overlapping section between the dynamically scheduled first resource grant and the configured second resource grant, data is transmitted or received in the overlapping section using the second resource grant. Since a resource grant usually corresponding to a high priority service is usually a configured resource grant, in the case that there is an overlapping between the dynamic scheduling resource grant and the configured resource grant, transmission of the high priority services can be ensured by using the configured resource grant preferentially.

FIG. 3 is a schematic flow chart of a wireless communication method 300 according to an implementation of the present disclosure. The method 300 includes at least part of the following contents. The method 300 may be performed by a communication device, such as a network device or a terminal device.

Optionally, the implementation of the present disclosure may be used for uplink data transmission or downlink data transmission. If the implementation of the present disclosure is used for downlink data transmission, the communication device implementing the implementation of the present disclosure may be a terminal device which serves as a receiving end, or may be a network device which serves as a transmitting end. If the implementation of the present disclosure is used for uplink data transmission, the communication device implementing the implementation of the present disclosure may be a network device which serves as a receiving end, or may be a terminal device which serves as a transmitting end.

In 310, in a case that a first service is contained in a logical channel to be transmitted and a configured grant timer corresponding to a second service with a lower priority than the first service is running, a new data indication (NDI) is flipped and data of the first service is transmitted or received on a resource grant, wherein the first service and the second service correspond to the same HARQ process.

Optionally, in an implementation of the present disclosure, the resource grant is a configured resource grant.

Optionally, in an implementation of the present disclosure, the first service and the second service are URLLC services; or the first service is a URLLC service, and the second service is a semi-statically transmitted service.

Specifically, the URLLC services may be grouped according to QoS levels, and different processing priorities may be configured. If a cache carrying URLLC data is not empty and carries data with higher priority at this time, no matter whether a configured grant timer for low priority services is still running, the NDI is considered to be flipped, the configured grant timer is started or restarted to inform a HARQ entity of the second resource grant and associated HARQ information.

Or, if the configured grant timer for the low priority services is still running, no operation is performed; if the configured grant timer is not running, it may be considered that the NDI is flipped, and the configured grant timer is started or restarted to inform a HARQ entity of the second resource grant and associated HARQ information.

Therefore, in the implementation of the present disclosure, in the case that the first service is contained in the logical channel to be transmitted and the configured grant timer corresponding to the second service with a lower priority than the first service is running, the new data indication (NDI) is flipped and the data of the first service is transmitted or received on the resource grant, wherein the first service and the second service correspond to the same HARQ process. Even if the configured timer corresponding to the low priority services is running, the NDI may be flipped as well to transmit high priority services, such that transmission of the high priority services may be improved.

FIG. 4 is a schematic flow chart of a wireless communication method 400 according to an implementation of the present disclosure. The method 400 includes at least part of the following contents. The method 400 may be performed by a communication device, such as a network device or a terminal device.

Optionally, the implementation of the present disclosure may be used for uplink data transmission or downlink data transmission. If the implementation of the present disclosure is used for downlink data transmission, the communication device implementing the implementation of the present disclosure may be a terminal device which serves as a receiving end, or may be a network device which serves as a transmitting end. If the implementation of the present disclosure is used for uplink data transmission, the communication device implementing the implementation of the present disclosure may be a network device which serves as a receiving end, or may be a terminal device which serves as a transmitting end.

In 410, in a case that there a first service preset to be transmitted using a first resource grant and a second resource grant exists, the first service is transmitted or received using the second resource grant;

wherein the first resource grant is a dynamic scheduling resource grant, and the second resource grant is a configured resource grant.

Optionally, in an implementation of the present disclosure, there is currently no first resource grant used for transmitting the first service.

Optionally, in an implementation of the present disclosure, there is currently no data of second service that is preset to be transmitted using the second resource grant.

Optionally, in an implementation of the present disclosure, a configured grant timer corresponding to the second resource grant is not started.

If there is no data to be transmitted in a URLLC data cache, if meanwhile there is an uplink resource of the first resource grant at this time, the second resource grant may be discarded and the data is transmitted using the first resource grant. Or, if there is no data to be transmitted in the URLLC data cache, and if there is no uplink resource of the first resource grant at this time, the data is transmitted using the second resource grant. Further, the configured grant timer may not be started or restarted. Or, the network device may be configured to use logical channel corresponding to an eMBB service of the resource for performing transmission using the second resource grant.

Therefore, in the implementation of the present disclosure, in the case that there is the first service that is preset to be transmitted using the first resource grant and the second resource grant exists, the first service is transmitted or received using the second resource grant, wherein the first resource grant is a dynamic scheduling resource grant and the second resource grant is a configured resource grant, such that transmission of data that needs to be dynamically scheduled can be ensured.

FIG. 5 is a schematic flow chart of a wireless communication method 1000 according to an implementation of the present disclosure. The method 1000 includes at least part of the following contents.

The method may be used for uplink transmission, at which time the method 1000 may be performed by a terminal device, and a resource grant may be an uplink resource grant, and the resource grant is sent by a network device to the terminal device.

Or the method may be used for downlink transmission, at which time the method may be performed by a network device, and a resource grant may be a downlink resource grant, and the resource grant is sent by the network device to a terminal device.

Of course, the method may also be used in other scenarios, for example, a scenario for sidelink communication, etc., which is not specifically limited in implementations of the present disclosure.

In 1010, a communication device determines at least one logical channel according to a first Radio Network Temporary Identifier (RNTI) used by a resource grant.

Specifically, before the communication device (terminal device or network device) generates a Media Access Control (MAC) Protocol Data Unit (PDU), it needs be determined that data in which logical channel(s) can be used to generate the MAC PDU. The logical channels may be determined according to the RNTI of the resource grant corresponding to a resource sending the MAC PDU, so that the network device can borrow the RNTI to indicate the logical channels of data, thus the network device can save signaling overhead while indicating the logical channels.

In the above, the first RNTI may be used for scrambling the resource grant.

The resource grant may indicate resources used for uplink transmission or downlink transmission.

Several implementation modes for determining the logical channels based on the first RNTI will be described below. It should be understood that the following implementation modes are only optional implementation modes of the implementations of the present disclosure, and should not impose specific limitations on the present disclosure.

In an implementation mode, the communication device determines a service type to be transmitted according to the first RNTI, and determines the at least one logical channel according to the service type to be transmitted.

Specifically, a RNTI may be associated with a service type, and if a service type is expected be transmitted between the network device and the terminal device, a RNTI corresponding to the service type may be used for scrambling the resource grant, so that after receiving the resource grant, the terminal device may determine which service type will be transmitted between the terminal device and the network device based on the RNTI used by the resource grant.

If the transmitting end is a terminal device, the terminal device may determine the service types based on the RNTI used by the received resource grant, while if the transmitting end is a network device, the network device may determine the service type based on the RNTI used by the transmitted resource grant.

After the service types are determined, since each service type may correspond to a specific logical channel, the terminal device or network device may determine the logical channels based on the determined service type.

Optionally, in an implementation of the present disclosure, the communication device may determine the service type to be transmitted based on the first RNTI and a correspondence between RNTIs and the service type.

The correspondence between the RNTIs and the service types may be a one-to-one correspondence, that is, one RNTI corresponds to one service type respectively. Of course, the correspondence may also be a multiple-to-one relation or a one-to-multiple relation.

Optionally, the correspondence between the RNTIs and the service types may be configured for the terminal device by the network device. Specifically, the correspondence may be configured by the network device through a Radio Resource Control (RRC) signaling. Or, the correspondence between the RNTIs and the service types may also be preset on the terminal device based on a protocol.

Optionally, the service types mentioned in the implementation of the present disclosure may include vehicle network services and/or industry network services (services corresponding to mechanical arms in industrial automation). That is to say, when the service types are divided, the divided types may include vehicle network services and/or industry network services, and of course, other service types may also be included.

It should be understood that in the implementations of the present disclosure, there may also be other types of division, for example, the vehicle network services may be further divided into multiple service types, which is not specifically limited in implementations of the present disclosure.

In another implementation mode, the communication device determines the at least one logical channel according to the first RNTI and a RNTI used by the resource grant that each logical channel is allowed to use.

Specifically, each logical channel may correspond to at least one RNTI, wherein the at least one RNTI corresponding to each logical channel is the RNTI used by the resource grant that the logical channel is allowed to use. When the MAC PDU needs to be generated, it may be determined which RNTI is used by the resource grant, then which logical channel or channels correspond to the RNTI may be determined, so that the MAC PDU may be generated using data of the at least one logical channel.

In the above, the RNTI used by the resource grant that each logical channel is allowed to use may be configured for the terminal device by the network device, for example, it may be configured through the RRC signaling. Or the RNTI used by the resource grant that each logical channel is allowed to use may also be preset on the terminal device based on the protocol.

It has been respectively described above that the at least one logical channel is determined based on the service types or the RNTI used by the resource grant that each logical channel is allowed to be used, and the network device may determine the at least one logical channel with reference to two factors in combination, i.e., the service types and the RNTI used by the resource grant that each logical channel is allowed to be used.

In 1020, the communication device generates a media access control (MAC) protocol data unit (PDU) according to the data in the at least one logical channel.

In 1030, the communication device transmits the MAC PDU on a resource indicated by the resource grant.

Optionally, in an implementation of the present disclosure, the resource grant is used for newly transmitting data.

Therefore, in an implementation of the present disclosure, the logical channel(s) may be determined according to the RNTI of the resource grant corresponding to the resource for sending the MAC PDU, so that the network device may borrow the RNTIs to indicate the logical channels of the data, thus the network device may save signaling overhead while indicating the logical channels.

FIG. 6 is a schematic flow chart of a wireless communication method 1100 according to an implementation of the present disclosure. The method 1100 includes at least part of the following contents.

The method may be used for uplink transmission, at which time the method 1000 may be performed by a network device, and a resource grant may be an uplink resource grant, and the resource grant is sent by the network device to a terminal device.

Or, the method may be used for downlink transmission, at which time the method may be performed by a terminal device, and a resource grant may be a downlink resource grant, and the resource grant is sent by a network device to the terminal device.

Of course, the method may also be used in other scenarios, for example, a scenario for sidelink communication, etc., which is not specifically limited in the implementation of the present disclosure.

In 1110, the communication device obtains a media access control (MAC) protocol data unit (PDU) on a resource indicated by a resource grant; and In 1120, the communication device determines at least one logical channel, to which data generating the MAC PDU belongs, according to a first radio network temporary identifier (RNTI) used by the resource grant.

In the above, after determining the at least one logical channel according to the first RNTI, the communication device may use the determined at least one logical channel to transmit an MAC Service Data Unit (SDU) contained in the MAC PDU to an upper layer, for example, to a Radio Link Control (RLC) layer and further to a Packet Data Convergence Protocol (PDCP) layer.

In an implementation mode, a service type to which the MAC PDU belongs is determined according to the first RNTI, and the at least one logical channel is determined according to the service type to which the MAC PDU belongs.

Optionally, the service type to which the MAC PDU belongs is determined according to the first RNTI and a correspondence between RNTIs and service types.

In the above, the correspondence is configured through a RRC signaling.

Optionally, in an implementation of the present disclosure, the services indicated by the service type to which the MAC PDU belongs include vehicle network services.

Optionally, in an implementation of the present disclosure, the services indicated by the service type to which the MAC PDU belongs include industry network services.

In an implementation mode, the at least one logical channel is determined according to the first RNTI and the RNTI used by the resource grant that each existing logical channel is allowed to use.

Optionally, in an implementation of the present disclosure, the RNTI used by the resource grant that each logical channel is allowed to use are configured through the RRC signaling.

Optionally, in an implementation of the present disclosure, the resource grant is used for newly transmitting data.

It should be understood that the specific implementation mode of the method 1100 may be described with reference to the specific description of the method 1000. For example, a way in which the communication device of method 1100 determines the logical channels according to the first RNTI may be described with reference to the description of method 1000, and the service types of method 1200 may be described with reference to the description of method 1000, which will not be repeated here for brevity.

It should be understood that in various implementations of the present disclosure, order of serial numbers of the foregoing processes do not mean an order of execution. The order of execution of the processes should be determined according to functions and internal logics of the processes, and should not impose any limitation on implementation mode processes of the implementations of the present disclosure.

FIG. 7 is a schematic flow chart of a wireless communication method 1400 according to an implementation of the present disclosure. The method 1400 includes at least part of the following contents.

Optionally, the implementation of the present disclosure may be used for uplink data transmission or downlink data transmission. If the implementation of the present disclosure is used for downlink data transmission, a communication device implementing the implementation of the present disclosure may be a network device which serves as a transmitting end. If the implementation of the present disclosure is used for uplink data transmission, the communication device implementing the implementation of the present disclosure may be a terminal device as a transmitting end.

In 1410, a first MAC PDU is generated for a first resource grant; and

In 1420, a second MAC PDU is generated for a second resource grant, wherein there is an overlapping section between the first resource grant and the second resource grant.

The first resource grant mentioned in the implementation of the present disclosure may be a dynamic scheduling resource grant or a configured resource grant, and the second resource grant may be a dynamic scheduling resource grant or a configured resource grant.

In an implementation mode, the first resource grant and the second resource grant are both configured resource grants.

In another implementation mode, the first resource grant and the second resource grant are both dynamic scheduling resource grants.

In another implementation mode, the first resource grant is a configured resource grant, and the second resource grant is a dynamic scheduling resource grant.

In another implementation mode, the first resource grant is a dynamic scheduling resource grant, and the second resource grant is a configured resource grant.

Optionally, in an implementation of the present disclosure, the configured resource grant may be a grant-free resource, that is, the resource grant does not need to be dynamically scheduled. The configured resource grant may optionally be a periodic resource grant.

The resource grant mentioned in the implementation of the present disclosure may be an uplink resource grant, which is used for uplink data transmission at this time, or may be a downlink resource grant, which may be used for downlink data transmission at this time.

Optionally, in an implementation of the present disclosure, the first resource grant is scrambled by a Cell Radio Network Temporary Identifier (C-RNTI), a temporary C-RNTI (TC-RNTI) or a Configured Scheduling RNTI (CS-RNTI); or the first resource grant is carried in a random access response.

Optionally, in an implementation of the present disclosure, that there is an overlapping section between the overlapping section between the first resource grant and the second resource grant may mean that there is an overlapping section between the first resource grant and the second resource grant in the time domain, wherein the overlapping section is an overlapping section in the time domain. Or that there is an overlapping section between the overlapping section between the first resource grant and the second resource grant may mean that there is an overlapping section between the first resource grant and the second resource grant in the frequency domain, wherein the overlapping section is an overlapping section in the frequency domain. That there is an overlapping section between the first resource grant and the second resource grant may mean that there is an overlapping section between the first resource grant and the second resource grant in the time-frequency domain (i.e., an overlapping section in both the time domain and the frequency domain), wherein the overlapping section is an overlapping section in the time-frequency domain.

In an implementation of the present disclosure, generation (which may also be called packing) time of the first MAC PDU may be earlier than generation time of the second MAC PDU. For example, start packing time of the first MAC PDU is earlier than start packing time of the second MAC PDU, and the start packing time of the first MAC PDU and the start packing time of the second MAC PDU may or may not overlap in time. For example, at the time when the first MAC PDU is packed, the second MAC PDU has already been packed.

Of course, in an implementation of the present disclosure, the start packing time of the first MAC PDU may also be the same as the start packing time of the second MAC PDU, and/or end packing time of the first MAC PDU may also be the same as end packing time of the second MAC PDU.

Of course, in an implementation of the present disclosure, the start packing time of the first MAC PDU may also be later than the start packing time of the second MAC PDU, and/or the end packing time of the first MAC PDU may also be later than the end packing time of the second MAC PDU.

That is to say, in the implementation, the packing time of the first MAC PDU and the packing time of the second MAC PDU, and their packing order may not be limited.

Optionally, in an implementation of the present disclosure, when a preset condition is met, the terminal device generates the second MAC PDU for the second resource grant, that is, the terminal device generates the MAC PDUs for both the first resource grant and the second resource grant. If the preset conditions cannot be met, a MAC PDU is generated for one of the first resource grant and the second resource grant, and no MAC PDU is generated for the other resource grant.

It should be understood that the implementation of the present disclosure is not limited to existence of a preset condition, that is, in the case that the first resource grant overlaps with the second resource grant, the MAC PDUs will be generated for the first resource grant and the second resource grant respectively.

In an implementation of the present disclosure, the preset condition may be a condition as to at least one of:
1) a hybrid automatic repeat request (HARQ) process of the first resource grant;
2) a HARQ process of the second resource grant;
3) a priority of the first resource grant;
4) a priority of the second resource grant;
5) an attribute of the first resource grant, wherein the attribute of the first resource grant may refer to QoS requirement, PUSCH duration, Modulation and Coding Scheme (MCS), and bearable logical channels, etc;

6) an attribute of the second resource grant;
wherein the attribute of the first resource grant may refer to QoS requirement, PUSCH duration, Modulation and Coding Scheme (MCS), and bearable logical channels, etc.
7) a logical channel to which data to be contained in the first MAC PDU belongs;
8) a logical channel to which data to be contained in the second MAC PDU belongs; and
9) whether there is a target logical channel.

The above-mentioned target logical channel may be a logical channel having at least one of following attributes: correspondence with a specific service (e.g., URLLC service, etc.), a target identifier and a target priority. Or the above-mentioned target logical channel may also be a logical channel of data to be transmitted. Or it may also be a logical channel matching with the first resource grant and/or the second resource grant (that is, data in the logical channel may be transmitted through the first resource grant and/or the second resource grant). If there is a logical channel matching with the first resource grant, an MAC PDU will be generated for the first source grant, and/or if there is a logical channel matching with the second resource grant, an MAC PDU will be generated for the second source grant.

Optionally, in an implementation of the present disclosure, the preset condition includes at least one of following conditions.

1) the HARQ process of the first resource grant is different from the HARQ process of the second resource grant.

In the above, the MAC PDUs may be generated for the first resource grant and the second resource grant respectively as long as the HARQ process of the first resource grant is different from the HARQ process of the second resource grant, or the condition 1) needs to be used in combination with other conditions to generate the MAC PDUs for the first resource grant and the second resource grant respectively.

2) the priority of the second resource grant is higher than the priority of the first resource grant.

3) the second resource grant matches with an LCP mapping limit configured for the target logical channel. At this time, this condition is a condition about the attribute of the second resource grant, and may also be a condition about configuration of the logical channel. The configuration of the logical channel may refer to QoS requirement, PUSCH duration, Modulation and Coding Scheme (MCS), priority information (such as a priority identifier), and latency information (such as a latency level), etc.

In the above, the target logical channel mentioned here may refer to a logical channel of data to be transmitted. That the second resource grant matches with the LCP mapping limit configured for the target logical channel may mean that there is the LCP mapping limit to the logical channel of the data to be transmitted, and if the second resource grant can match with the LCP mapping limit, the MAC PDU can be packed based on the data to be transmitted to generate the second MAC PDU. Or, the target logical channel mentioned here may refer to a specific logical channel, i.e., a logical channel corresponding to specific services, such as URLLC services, or a logical channel corresponding to a target logical channel identifier or a logical channel priority. Or, the target logical channel at this time may be both a logical channel of the data to be transmitted and a specific logical channel at the same time.

4) the attribute of the second resource grant meets transmission configuration of the target logical channel.

Specifically, that the attribute of the second resource grant meets the transmission configuration of the target logical channel may mean that the second resource grant can meet a transmission requirement of the logical channels, wherein the attribute of the second resource grant may refer to QoS requirement, PUSCH duration, Modulation and Coding Scheme (MCS), and bearable logical channels, etc. The target logical channel mentioned here may refer to a logical channel of data to be transmitted. That the attribute of the second resource grant meets the transmission configuration of the target logical channel may mean that if the attribute of the second resource grant can meet the transmission configuration of the logical channel of the data to be transmitted, the MAC PDU may be packed based on the data to be transmitted to generate the second MAC PDU. Or, the target logical channel mentioned here may be a specific logical channel, i.e., a logical channel corresponding to specific services, such as URLLC service, or a logical channel corresponding to a target logical channel identifier or a logical channel priority. Or, the target logical channel at this time may be both a logical channel of the data to be transmitted and a specific logical channel at the same time.

5) data to be carried in the second MAC PDU belongs to the target logical channel.

Specifically, if the data to be transmitted on the second resource grant belongs to the target logical channel, the data may be encapsulated in the second MAC PDU. The data to be carried in the second MAC PDU may be generated before transmission of the second resource grant and after encapsulation of the first MAC PDU. In the above, the target logical channel mentioned here may be a logical channel having at least one of following attributes: correspondence with a specific service (e.g., URLLC service, etc.), a target identifier and a target priority.

6) the logical channel to which data to be contained in the first MAC PDU belongs do not belong to the target logical channel. The data to be contained in the MAC PDU mentioned in the implementation of the present disclosure may be data that may be contained, data to be contained, or data already contained in the MAC PDU.

Specifically, if the data contained in the first MAC PDU does not belong to the target logical channel, the second MAC PDU needs to be encapsulated. In the above, the target logical channel mentioned here may be a logical channel having at least one of following attributes: correspondence with a specific service (e.g., URLLC service, etc.), a target identifier and a target priority.

7) a priority of the logical channel to which data to be contained in the first MAC PDU belongs is lower than a priority of the logical channel to which data to be contained in the second MAC PDU belongs.

8) a priority of the logical channel to which data to be contained in the first MAC PDU belongs is lower than a priority of the target logical channel.

In the above, the target logical channel mentioned here may be a logical channel having at least one of following attributes: correspondence with a specific service (e.g., URLLC service, etc.), a target identifier and a target priority.

9) the priority of the first resource grant is lower than the priority of the second resource grant.

10) the first resource grant does not match with the LCP mapping limit configured for the target logical channel.

The target logical channel mentioned here may refer to a logical channel of data to be transmitted. Or the target logical channel mentioned here may be a specific logical channel, i.e., a logical channel corresponding to a specific service, such as a URLLC service, or a logical channel corresponding to a target logical channel identifier or a logical channel priority. Or, the target logical channel at this time may be both a logical channel of the data to be transmitted and a specific logical channel at the same time.

11) the attribute of the first resource grant do not meet transmission configuration of the target logical channel.

Specifically, that the attribute of the first resource grant do not meet the transmission configuration of the target logical channel may mean that the first resource grant does not meet transmission requirement of the logical channel. In the above, the attribute of the first resource grant may refer to QoS requirement, PUSCH duration, Modulation and Coding Scheme (MCS), and bearable logical channels, etc. The target logical channel mentioned here may refer to a logical channel of data to be transmitted. The target logical channel mentioned herein may be a specific logical channel, i.e., a logical channel corresponding to a specific service, such as a URLLC service, or a logical channel corresponding to a target logical channel identifier or a logical channel priority. Or, the target logical channel at this time may be both logical channels of the data to be transmitted and a specific logical channel at the same time.

It should be understood that the above conditions are only one implementation mode of the implementation of the present disclosure, which are not specifically limited in implementations of the present disclosure.

For example, the condition 2) that the priority of the second resource grant is higher than the priority of the first resource grant may be replaced with that the priority of the second resource grant is the same as the priority of the first resource grant, or replaced with that the priority of the second resource grant is higher than or equal to the priority of the first resource grant.

For example, the condition 7) that the priority of the logical channel to which data to be contained in the first MAC PDU belongs is lower than the priority of the logical channel to which data to be contained in the second MAC PDU belongs may be replaced with that the priority of the logical channel to which the data to be contained in the first MAC PDU belongs is the same as the priority of the logical channel to which the data to be contained in the second MAC PDU belongs. Specifically, the condition 7) may be that the highest priority of the logical channel to which the data to be contained in the first MAC PDU belongs is the same as the highest priority of the logical channel to which the data to be contained in the second MAC PDU belongs; or the condition 7) may be that the priority of each of the logical channels to which data to be contained in the first MAC PDU belongs is equal to the priority of each of the logical channels to which data to be contained in the first MAC PDU belongs; or the condition 7) may be that the first number of logical channels, whose priority exceeds a first priority threshold, among the logical channels to which the data to be contained in the first MAC PDU belongs, is the same as the second number of logical channels, whose priority exceeds a second priority threshold, among the logical channels to which the data to be contained in the second MAC PDU belongs; or the condition 7) may be that a logical channel priority threshold configured for or indicated to a resource corresponding to the first MAC PDU is the same as a logical channel priority threshold configured for or indicated to a resource corresponding to the second MAC PDU, wherein the first priority threshold and the second priority threshold may be the same or different. For example, the condition may not be limited to that the first number needs to be the same as the second number, other conditions may also need to exist. For example, an interval (e.g., the number of priorities in the interval) between the priority of logical channels, whose priority exceeds the first priority threshold, and the first priority threshold is equal to an interval between the priority of logical channels, whose priority exceeds the second priority threshold, and the second priority threshold. Or the condition 7) may be replaced with that the priority of the logical channel to which the data to be contained in the first MAC PDU belongs is lower than or equal to the priority of the logical channel to which the data to be contained in the second MAC PDU belongs.

For example, the condition 10) that the first resource grant does not match with the LCP mapping limit configured for the target logical channel may be replaced with that the first resource grant matches with the LCP mapping limit configured for the target logical channel, which means that the preset condition at this time may include that both the first resource grant and the second resource grant match with the LCP mapping limit configured for the target logical channel.

In the above, the target logical channel (referred to as a first target logical channel here), whose LCP mapping limit needs to be met by the first resource grant, may be a logical channel of data to be carried in the first resource grant or a logical channel of a specific service, and the target logical channel (referred to as a second target logical channel here), whose LCP mapping limit needs to be met by data contained in the second resource grant, may be a logical channel of the data to be carried in the second resource grant or a logical channel of a specific service, wherein the first logical channel may be the same as or different from the second logical channel.

For example, the condition 11) that the attribute of the first resource grant does not meet the transmission configuration of the target logical channel may be replaced with that the attribute of the first resource grant meets the transmission configuration of the target logical channel, which means that the preset condition at this time may include that both the attribute of the first resource grant and the attribute of the second resource grant meet the transmission configuration of the target logical channel.

In the above, the target logical channel (defined as a first target logical channel here), whose transmission configuration needs to be met by the attribute of the first resource grant, may be a logical channel of data to be carried in the first resource grant or a specific logical channel (e.g., a logical channel of a specific service may be a logical channel having the following attributes: a specific service, a specific identifier and/or a specific priority), and the target logical channel (defined as a second target logical channel here), whose LCP mapping limit needs to be met by the data contained in the second resource grant, may be a logical channel of data to be carried in the second resource grant or a specific logical channel (e.g., a logical channel of a specific service may be a logical channel having the following attributes: a specific service, a specific identifier and/or a specific priority), wherein the first target logical channel may be the same as or different from the second target logical channel.

In addition to the above preset conditions, the preset condition in the implementation in the present disclosure may also include other conditions, for example, the attribute of the first resource grant and the attribute of the second resource grant are the same.

For example, at least one of the QoS requirement, the PUSCH duration, the MCS and the bearable logical channels of the first resource grant may be the same as at least one of the QoS requirement, the PUSCH duration, the MCS and the bearable logical channels of the second resource grant.

In this case, neither or both of the attribute of the first resource grant and the attribute of the second resource grant may meet the transmission configuration of the target logical channel, or neither or both of the first resource grant and the second resource grant may match with the LCP mapping limit configured for the target logical channel.

The target logical channel mentioned in the implementation of the present disclosure may be one or more logical channels, or may be a logical channel group.

The logical channel in the implementation of the present disclosure may correspond to a service, that is, there is a correspondence between the logical channel and the service, and the target logical channel may be a logical channel of a specific service. The above-mentioned target logical channel may be replaced with a target service. Or, the above-mentioned target logical channel may be a logical channel having at least one of the following attributes: correspondence with a specific service (e.g., URLLC service, etc.), a target identifier and a target priority. Or, the above-mentioned target logical channel may also be a logical channel of data to be transmitted. In the implementation of the present disclosure, which logical channel(s) is the target logical channel may be specifically indicated by the network device or determined according to a preset rule. For example, the network device configures threshold information, and determines whether it is target logical channel information according to the threshold information. The threshold may be a priority threshold, an identification threshold, etc. For example, a priority threshold is configured, and a logical channel, whose priority value is less than (or may be equal to or greater than) this threshold, is the target logical channel of this threshold. For example, an identification threshold is configured, and a logical channel, whose identification value is less than (may be equal to or greater than) this threshold, is the target logical channel of this threshold. For another example, the network device configures identification information, and determines whether it is the target logical channel information according to the identification information. For example, logical channels with priorities of 1 and 2 are configured as target logical channels, and logical channels with an identification value of 1 or 2 are configured as target logical channels. The above combinations are not limited.

In an implementation of the present disclosure, the priority of the logical channel to which data contained in the MAC PDU belongs may be determined in one of the follow ways: the priority of a logical channel with the highest priority among the logical channels to which the data belongs may be determined as the priority of the logical channel to which the data belongs, or the priority of the logical channel to which the data belongs may be determined according to whether there is a logical channel whose priority is higher than the priority threshold (which may be preset at the terminal device side or indicated by the network device) among the logical channels to which the data belongs; or, the priority of the logical channel to which the data belongs may be determined according to the number of logical channels whose priority is higher than the priority threshold existing in the logical channels to which the data belongs.

One or more of the above-mentioned conditions may be selected to be used.

In an implementation of the present disclosure, whether the MAC PDUs are generated for both of or one of the first resource grant and the second resource grant may be determined after one of the MAC PDUs has been generated, or before any of the two MAC PDUs is generated.

Optionally, in an implementation of the present disclosure, whether to generate the MAC PDUs or not may be determined for the first resource grant and whether to generate the MAC PDUs or not may be determined for the second resource grant.

In the above, whether to generate the MAC PDUs or not may be determined for the first resource grant based on the attribute of the first resource grant without considering the attribute of the second resource grant.

For example, it may be determined whether the first resource grant matches with the LCP mapping limit configured for the target logical channel, whether the attribute of the first resource grant meets the transmission configuration of the target logical channel, whether the logical channel to which data to be carried by the first resource grant belongs is a target logical channel (specifically, whether there is a target logical channel), whether the priority of the first resource grant is greater than a specific priority, whether the priority of the logical channel to which the data to be carried by the first resource grant belongs is higher than a specific priority, whether the identifier of the logical channel to which the data to be carried by the first resource grant belongs is a specific identifier, and whether there is a target logical channel. If yes, the MAC PDUs may be generated based on the first resource grant. It should be understood that one of the conditions here may be selected, or more conditions may exist.

For example, it may be determined whether the second resource grant matches with the LCP mapping limit configured for the target logical channel, whether the attribute of the second resource grant meets the transmission configuration of the target logical channel, whether the logical channel to which data to be carried by the second resource grant belongs is a target logical channel, whether the priority of the second resource grant is greater than a specific priority, whether the priority of the logical channel to which the data to be carried by the second resource grant belongs is higher than a specific priority, whether the identifier of the logical channel to which the data to be carried by the second resource grant belongs is a specific identifier, and whether there is a target logical channel. If yes, the MAC PDUs may be generated based on the first resource grant. It should be understood that one of the conditions here may be selected, or more conditions may exist.

Optionally, in an implementation of the present disclosure, in the case that the terminal device generates the first MAC PDU and the second MAC PDU, the first MAC PDU and the second MAC PDU may be transmitted. In the above, the first MAC PDU may be transmitted through the first resource grant, and the second MAC PDU may be transmitted through the second resource grant. Or, the first MAC PDU may be transmitted through the first resource grant, and the second MAC PDU may be transmitted through a resource grant other than the first resource grant and the second resource grant. Or, the first MAC PDU may be transmitted through a resource grant other than the first resource grant and the second resource grant, and the second MAC PDU may be transmitted through the second resource grant.

Or, in an implementation of the present disclosure, the terminal device may transmit one of the first MAC PDU and the second MAC PDU. For example, the second MAC PDU mentioned above may be transmitted. Specifically, the second MAC PDU mentioned above may be transmitted through the second resource grant, and the first MAC PDU may be discarded.

It has been described above that the MAC PDUs may be generated for the first resource grant and the second resource grant respectively in the case that there is the overlapping section between the first resource grant and the second resource grant. The implementation of the present disclosure may also be applicable to a case where more than two resource grants overlap in resources, at which time the MAC PDUs may be generated respectively for the multiple resource grants, or the MAC PDUs may be generated for part (e.g., the first resource grant and the second resource grant) of multiple resource grants.

Optionally, in the implementation of the present disclosure, the condition that there is the overlapping section between the first resource grant and the second resource grant is set forth above, but the implementation of the present disclosure is not limited thereto.

For example, the first resource grant and/or the second resource grant may be replaced with resource(s) occupied by a Scheduling Request (SR), and the logical channel to which data to be carried by the first resource grant or the second resource grant belongs may be a logical channel that triggers the scheduling request (i.e., the logical channel of the data to be transmitted, the target logical channel, a logical channel indicated by the SR).

For example, the first resource grant and/or the second resource grant may be replaced with resource(s) occupied by a physical uplink control channel (PUCCH), and the logical channel to which the data to be carried by the first resource grant or the second resource grant belongs may be replaced with a logical channel to which data for control information (e.g., feedback information, SR information and CSI-RS information) carried by the PUCCH belongs.

Specifically, the implementation of the present disclosure may be applicable to a case where a resource occupied by a SR overlaps with a resource grant, a case where a resource occupied by one SR overlaps with a resource occupied by another SR, a case where a resource occupied by the SR overlaps with a resource occupied by the PUCCH, a case where a resource grant overlaps with a resource occupied by the PUCCH, and a case where a case where a resource occupied by one PUCCH overlaps with a resource occupied by another PUCCH.

For example, a resource occupied by a SR overlap with a resource occupied by a PUSCH, and if a priority of the logical channel triggering the SR is higher than a threshold, it is indicated that a physical layer sends the SR. For another example, the resource occupied by the SR overlap with resource occupied by the PUSCH, and if the priority of the logical channel triggering the SRs is higher than the threshold and a priority of a logical channel carried by the PUSCH is higher than the threshold, it is indicated that the physical layer sends the SR and the PUSCH is not indicated, the PUSCH may be or may not be indicated to the physical layer. For example, the resource occupied by the SR overlap with the resource occupied by the PUSCH, and if a priority of a logical channel contained in the PUSCH is higher than the threshold, it is indicated that the physical layer sends the PUSCH and the SR is not indicated. Combination modes thereof are not limited.

Figure 8:
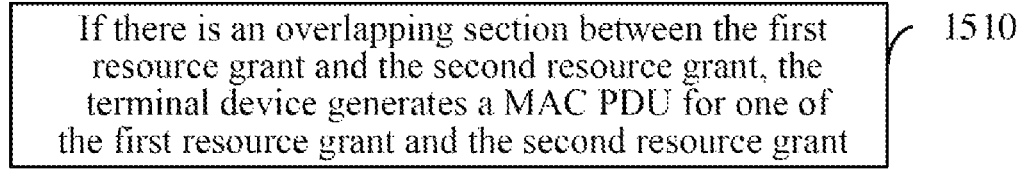
FIG. 8 is a schematic flow chart of a wireless communication method according to an implementation of the present disclosure.

FIG. 8 is a schematic flow chart of a wireless communication method 1500 according to an implementation of the present disclosure. The method 1500 includes at least part of the following contents.

Optionally, the implementation of the present disclosure may be used for uplink data transmission or downlink data transmission. If the implementation of the present disclosure is used for downlink data transmission, a communication device implementing the implementation of the present disclosure may be a network device which serves as a transmitting end. If the implementation of the present disclosure is used for uplink data transmission, the communication device implementing the implementation of the present disclosure may be a terminal device which serves as a transmitting end.

In 1510, if there is an overlapping section between a first resource grant and a second resource grant, a MAC PDU may be generated for one of a first resource grant and a second resource grant, but may not be generated for the other resource grant. The MAC PDU generated for the resource grant may be transmitted on the resource grant.

The first resource grant mentioned in the implementation of the present disclosure may be a dynamic scheduling resource grant or a configured resource grant, and the second resource grant may be a dynamic scheduling resource grant or a configured resource grant.

In an implementation mode, the first resource grant and the second resource grant are both configured resource grants.

In another implementation mode, the first resource grant and the second resource grant are both dynamic scheduling resource grants.

In another implementation mode, the first resource grant is a configured resource grant, and the second resource grant is a dynamic scheduling resource grant.

In another implementation mode, the first resource grant is a dynamic scheduling resource grant, and the second resource grant is a configured resource grant.

Optionally, in an implementation of the present disclosure, the configured resource grant may be a grant-free resource, that is, the resource grant does not need to be dynamically scheduled. The configured resource grant may optionally be a periodic resource grant.

The resource grant mentioned in the implementation of the present disclosure may be an uplink resource grant, which is used for uplink data transmission at this time, or may be a downlink resource grant, which may be used for downlink data transmission at this time.

Optionally, in an implementation of the present disclosure, the first resource grant is scrambled by a Cell Radio Network Temporary Identifier (C-RNTI), a temporary C-RNTI (TC-RNTI) or a Configured Scheduling RNTI (CS-RNTI); or the first resource grant is carried in a random access response.

Optionally, in an implementation of the present disclosure, that there is an overlapping section between the first resource grant and the second resource grant may mean that there is an overlapping section between the first resource grant and the second resource grant in the time domain, wherein the overlapping section is an overlapping section in the time domain. Or that there is an overlapping section between the overlapping section between the first resource grant and the second resource grant may mean that there is an overlapping section between the first resource grant and the second resource grant in the frequency domain, wherein the overlapping section is an overlapping section in the frequency domain. That there is an overlapping section between the first resource grant and the second resource grant may mean that there is an overlapping section between the first resource grant and the second resource grant in the time-frequency domain (i.e., an overlapping section in both the time domain and the frequency domain), wherein the overlapping section is an overlapping section in the time-frequency domain.

Optionally, in an implementation of the present disclosure, when a preset condition is met, the terminal device generates a MAC PDU for the one resource grant. If the preset condition cannot be met, MAC PDUs are generated for the first resource grant and the second resource grant respectively.

Optionally, in an implementation of the present disclosure, the preset conditions may be conditions about at least one of:

1) a hybrid automatic repeat request (HARD) process of the first resource grant;
2) a HARQ process of the second resource grant;
3) a priority of the first resource grant;
4) a priority of the second resource grant;
5) an attribute of the first resource grant, wherein the attribute of the first resource grant may refer to QoS requirement, PUSCH duration, Modulation and Coding Scheme (MCS), and bearable logical channels, etc;
6) an attribute of the second resource grant, wherein the attribute of the second resource grant may refer to QoS requirement, PUSCH duration, Modulation and Coding Scheme (MCS), and bearable logical channels;
7) a logical channel to which data to be carried by the first resource grant belongs, wherein the data to be carried by the first resource grant may be data to be contained in the a first MAC PDU, which may specifically be data to be contained, data already contained, and data that may be contained;
8) a logical channel to which data to be carried by the first resource grant belongs, wherein the data to be carried by the second resource grant may be data to be contained in a second MAC PDU, which may specifically be data to be contained, data already contained, and data that may be contained; and
9) whether there is a target logical channel.

The above-mentioned target logical channel may be a logical channel having at least one of the following attributes: correspondence with a specific service (e.g., URLLC service, etc.), a target identifier and a target priority. Or, the above-mentioned target logical channel may also be a logical channel of data to be transmitted. Or, the above-mentioned target logical channel may also be a logical channel matching with the first resource grant and/or the second resource grant (that is, data in the logical channel can be transmitted through the first resource grant and/or the second resource grant). If there is a logical channel matching with the first resource grant, an MAC PDU will be generated for the first source grant, and/or if there is a logical channel matching with the second resource grant, an MAC PDU will be generated for the second source grant.

Optionally, in an implementation of the present disclosure, it is assumed that one resource grant is the first resource grant. The preset conditions include at least one of the following conditions:

1) the first MAC PDU has been generated for the first resource grant.

Specifically, if the first MAC PDU has been generated and only one of the first resource grant and the second resource grant resource grant can be transmitted, the MAC PDU may no longer need to be generated for the second resource grant at this time.

2) the first MAC PDU has been indicated to a physical layer.

Specifically, if the first MAC PDU generated for the first resource grant is indicated to the physical layer and only one of the first resource grant and the second resource grant resource grant may be transmitted, the MAC PDU may not need to be generated for the second resource grant at this time.

3) the first MAC PDU has been transmitted through the first resource grant.

Specifically, if the first MAC PDU generated for the first resource grant has been transmitted (e.g., it is being transmitted or is already transmitted) and only one of the first resource grant and the second resource grant resource grant can be transmitted, the MAC PDU may not need to be generated for the second resource grant at this time.

4) the HARQ process of the first resource grant is the same as the HARQ process of the second resource grant.

In the above, the MAC PDU may be generated for one of the first resource grant and the second resource grant as long as the HARQ process of the first resource grant is the same as the HARQ process of the second resource grant, or the condition 4) needs to be used in combination with other conditions to generate the MAC PDUs for the first resource grant and the second resource grant respectively.

5) the priority of the second resource grant is lower than the priority of the first resource grant.

6) the second resource grant does not match with an LCP mapping limit configured for the target logical channel. At this time, this condition is a condition about the attribute of the second resource grant, and may also be a condition about configuration of the logical channel. The configuration of the logical channels may refer to QoS requirement, PUSCH duration, Modulation and Coding Scheme (MCS), priority information (such as a priority identifier), and latency information (such as a latency level).

In the above, the target logical channel mentioned herein may refer to a logical channel of data to be transmitted. That the second resource grant does not match with the LCP mapping limit configured for the target logical channel may mean that the logical channel of the data to be transmitted has the LCP mapping limit, and if the second resource grant cannot match with the LCP mapping limit, the MAC PDU may not be packed based on the data to be transmitted to generate the second MAC PDU for transmission on the second resource grant. Further, the target logical channel mentioned here may refer to a logical channel of the data to be transmitted, wherein the logical channel is a specific logical channel, i.e., a logical channel corresponding to a specific service, such as a URLLC service, or a logical channel corresponding to a target logical channel identifier or a logical channel priority.

7) the attribute of the second resource grant does not meet transmission configuration of the target logical channel.

Specifically, that the attribute of the second resource grant meets the transmission configuration of the target logical channel may mean that the second resource grant does not meet transmission requirement of the logical channel, wherein the attribute of the second resource grant may refer to QoS requirement, etc. The target logical channel mentioned here may refer to a logical channel of the data to be transmitted. Or, the target logical channel mentioned here may be a specific logical channel. Further, the target logical channel mentioned here may refer to a logical channel of the data to be transmitted, wherein the logical channel is a specific logical channel, i.e., a logical channel corresponding to a specific service, such as a URLLC service, or a logical channel corresponding to a target logical channel identifier or a logical channel priority.

8) data to be carried by the second resource grant does not belong to the target logical channel.

Specifically, if the data to be transmitted by the second resource grant does not belong to the target logical channel, the MAC PDU may not be encapsulated for the second resource grant, wherein the target logical channel mentioned here may be a logical channel having at least one of following attributes: correspondence with a specific service (e.g., a URLLC service, etc.), a target identifier and a target priority.

9) the logical channel to which data to be contained in the first MAC PDU belongs do not belong to the target logical channel.

Specifically, if the logical channel to which the data contained in the first MAC PDU belongs belong to the target logical channel, the MAC PDU does not need to be encapsulated for the second resource grant, wherein the target logical channel mentioned here may be a logical channel having at least one of following attributes: correspondence with a specific service (e.g., a URLLC service, etc.), a target identifier and a target priority.

10) a priority of the logical channel to which the data to be carried by the first resource grant belongs is higher than a priority of the logical channel to which the data to be carried by the second resource grant belongs.

11) a priority of the logical channel to which the data to be carried by the first resource grant belongs is higher than a priority of the target logical channel.

In the above, the target logical channel mentioned here may be a logical channel having at least one of following attributes: correspondence with a specific services (e.g., a URLLC service, etc.), a target identifier and a target priority.

12) the priority of the first resource grant is higher than the priority of the second resource grant.

13) the first resource grant matches with the LCP mapping limit configured for the target logical channel. That the first resource grant matches with the LCP mapping limit configured for the target logical channel may mean that a logical channel of the data to be transmitted has the LCP mapping limit, and if the first resource grant can match with the LCP mapping limit, the MAC PDU may be packed based on the data to be transmitted to generate the first MAC PDU. Further, the target logical channel mentioned here may refer to a logical channel of the data to be transmitted, wherein the logical channel is a specific logical channel, i.e., a logical channel corresponding to a specific service, such as a URLLC service, or a logical channel corresponding to a target logical channel identifier or a logical channel priority.

14) the attribute of the first resource grant meets transmission configuration of the target logical channel.

Specifically, that the attribute of the first resource grant meets the transmission configuration of the target logical channel may mean that the first resource grant can meet transmission requirement of the logical channel, wherein the attribute of the first resource grant may refer to QoS requirement, PUSCH duration, Modulation and Coding Scheme (MCS), and bearable logical channels, etc. The target logical channel mentioned here may refer to a logical channel of the data to be transmitted. That the attribute of the first resource grant meets the transmission configuration of the target logical channel may mean that if the attribute of the first resource grant can meet transmission configuration of the logical channel of the data to be transmitted, the MAC PDU may be packed based on the data to be transmitted to generate the first MAC PDU. Further, the target logical channel mentioned here may refer to a logical channel of the data to be transmitted, wherein the logical channel is a specific logical channel, i.e., a logical channel corresponding to a specific service, such as a URLLC service, or a logical channel corresponding to a target logical channel identifier or a logical channel priority.

It should be understood that the above conditions are only one implementation mode of the implementation of the present disclosure, which is not specifically limited in implementations of the present disclosure.

For example, the condition 12) that the priority of the first resource grant is higher than the priority of the second resource grant may be replaced with that the priority of the first resource grant is the same as the priority of the second resource grant, or replaced with that the priority of the first resource grant is higher than or equal to the priority of the second resource grant.

For example, the condition 10) that the priority of the logical channel to which data to be carried by the first resource grant belongs is higher than the priority of the logical channel to which data to be carried by the second resource grant belongs may be replaced with that the priority of the logical channel to which the data to be carried by the first resource grant belongs is equal to the priority of the logical channel to which the data to be carried by the second resource grant belongs. Specifically, the condition 10) may be that the highest priority of the logical channel to which the data to be carried by the first resource grant belongs is the same as the highest priority of the logical channel to which the data to be carried by the second resource grant belongs; or the condition 10) may be that the priority of each of the logical channels to which the data to be carried by the first resource grant belongs is equal to the priority of each of the logical channel to which the data to be carried by the second resource grant belongs; or the condition 10) may be that a logical channel priority threshold configured for or indicated to a resource corresponding to the first MAC PDU is the same as a logical channel priority threshold configured for or indicated to a resource corresponding to the second MAC PDU; or the condition 10) may be that the first number of logical channels, whose priority exceeds a first priority threshold, among the logical channels to which the data to be carried by the first resource grant belongs, is the same as the second number of logical channels, whose priority exceeds a second priority threshold, among the logical channels to which the data to be carried by the second resource grant belongs, wherein the first priority threshold and the second priority threshold may be the same or different. For example, the condition may not be limited to that the first number needs to be the same as the second number, other conditions may also need to exist. For example, an interval (e.g., the number of priorities in the interval) between the priority of logical channels, whose priority exceeds the first priority threshold, and the first priority threshold is equal to an interval between the priority of logical channels, whose priority exceeds the second priority threshold, and the second priority threshold. Or the condition 10) may be replaced with that the priority of the logical channel to which the data to be carried by the first resource grant belongs is equal to or higher than the priority of the logical channel to which the data to be carried by the second resource grant belongs.

For example, the condition 6) that the second resource grant does not match with the LCP mapping limit configured for the target logical channel may be replaced with that the second resource grant matches with the LCP mapping limit configured for the target logical channel, which means that the preset condition at this time may include that both the first resource grant and the second resource grant match with the LCP mapping limit configured for the target logical channel.

In the above, the target logical channel (referred to as a first target logical channel here), whose LCP mapping limit needs to be met by the first resource grant, may be a logical channel of the data to be carried in the first resource grant or a specific logical channel (e.g., a logical channel of a specific service may be a logical channel having at least one of following attributes: a specific service, a specific identifier and/or a specific priority); and the target logical channel (referred to as a second target logical channel here), whose LCP mapping limit needs to be met by data contained in the second resource grant, may be a logical channel of the data to be carried in the second resource grant or a specific logical channel (e.g., a logical channel of a specific service may be a logical channel having at least one of following attributes: a specific service, a specific identifier and/or a specific priority). The first target logical channel may be the same as or different from the second target logical channel For example, the condition 7) that the attribute of the second resource grant does not meet the transmission configuration of the target logical channel may be replaced with that the attribute of the second resource grant meets the transmission configuration of the target logical channel, which means that the preset condition at this time may include that both the attribute of the first resource grant and the attribute of the second resource grant meet the transmission configuration of the target logical channel.

In the above, the target logical channel (defined as a first target logical channel herein), whose transmission configuration needs to be met by the attribute of the first resource grant, may be a logical channel of the data to be carried in the first resource grant or a specific logical channel (e.g., a logical channel of a specific service may be a logical channel having the following attributes: a specific service, a specific identifier and/or a specific priority), and the target logical channel (defined as a second target logical channel herein), whose LCP mapping limit needs to be met by data contained in the second resource grant, may be a logical channel of the data to be carried in the second resource grant or a specific logical channel (e.g., a logical channel of a specific service may be a logical channel having the following attributes: a specific services, a specific identifier and/or a specific priority). The first target logical channel may be the same as or different from the second target logical channel.

In addition to the above preset conditions, the preset condition in the implementation of the present disclosure may also include other conditions, for example, the attribute of the first resource grant and the attribute of the second resource grant are the same.

For example, at least one of the QoS requirement, the PUSCH duration, the MCS and the bearable logical channels of the first resource grant may be the same as at least one of the QoS requirement, the PUSCH duration, the MCS and the bearable logical channels of the second resource grant.

In this case, neither or both of the attribute of the first resource grant and the attribute of the second resource grant may meet the transmission configuration of the target logical channel, or neither or both of the first resource grant and the second resource grant may match with the LCP mapping limit configured for the target logical channel.

In the above conditions, it is assumed that the first resource grant is selected to generate the MAC PDU, and in the implementation of the present disclosure, the second resource grant may also be selected to generate the MAC PDU.

The target logical channel mentioned in the implementation of the present disclosure may be one or more logical channels, or may be a logical channel group. The logical channel in the implementation of the present disclosure may correspond to a service, that is, there is a correspondence between the logical channel and the service, and the target logical channel may be a logical channel of a specific service. The above-mentioned target logical channel may be replaced with a target service. Or, the above-mentioned target logical channel may be a logical channel having at least one of the following attributes: correspondence with a specific service (e.g., a URLLC service, etc.), a target identifier and a target priority. Or, the above-mentioned target logical channel may also be a logical channel of the data to be transmitted.

In an implementation of the present disclosure, which logical channel(s) is specifically the target logical channel may be indicated by the network device or determined according to a preset rule. For example, the network configures threshold information, and determines whether it is target logic channel information according to the threshold information. The threshold may be a priority threshold, an identification threshold, etc. For example, a priority threshold is configured, and a logical channel, whose priority value is less than (or may be equal to or greater than) this threshold, is the target logical channel. For example, an identification threshold is configured, and a logical channel, whose identification value is less than (or may be equal to or greater than) this threshold, is the target logical channel. For another example, the network device configures identification information, and whether the logical channel is the target logical channel information is determined according to the identification information. For example, logical channels with priorities of 1 and 2 are configured as target logical channels, and logical channels with an identification value of 1 or 2 are configured as target logical channels. The above combinations modes are not limited.

In an implementation of the present disclosure, the priority of the logical channel to which data contained in the MAC PDU belongs may be determined in one of the follow ways: a priority of a logical channels with the highest priority among the logical channels to which the data belongs may be determined as the priority of the logical channel to which the data belongs, or the priority of the logical channel to which the data belongs may be determined according to whether there is a logical channel, whose priority is higher than the priority threshold (which may be preset at the terminal device side or indicated by the network device), in the logical channels to which the data belongs; or, the priority of the logical channel to which the data belongs may be determined according to the number of logical channels, whose priority is higher than the priority threshold, among the logical channels to which the data belongs.

One or more of the above-mentioned conditions may be selected to be used.

In the above, time preset to generate the MAC PDU for the first resource grant may be earlier than time preset to generate the MAC PDU for the second resource grant. For example, preset start packing time of the MAC PDU of the first resource grant is earlier than preset start packing time of the MAC PDU of the second resource grant. The preset packing time of the MAC PDU of the first resource grant may or may not overlap with the preset packing time of the MAC PDU of the second resource grant in time. In the above, the preset packing time may be original preset time at which the MAC PDU needs to be packed, and means that the packing will inevitably take place.

Of course, in an implementation of the present disclosure, the preset start packing time of the MAC PDU of the first resource grant may be the same as the preset start packing time of the MAC PDU of the second resource grant, and/or preset end packing time of the MAC PDU of the first resource may also be the same as preset end packing time of the MAC PDU of the second resource grant.

Or, the preset start packing time of the MAC PDU of the first resource grant may be later than the preset start packing time of the MAC PDU of the second resource grant, and/or the preset end packing time of the MAC PDU of the first resource grant may be later than the preset end packing time of the MAC PDU of the second resource grant.

That is to say, in the implementation, the time at which the MAC PDUs are packed for the first resource grant and for the second resource grant, and their packing order may not be limited.

Optionally, in an implementation of the present disclosure, it is mentioned above that the MAC PDU may be generated for one resource grant when the preset condition is met, and in an implementation of the present disclosure, the MAC PDU may also be generated for one resource grant according to an indication from the network device or a preset rule. For example, if the network device or the preset rule indicates that the MAC PDU is generated for one resource grant, the MAC PDU may be generated for one resource grant.

Optionally, in an implementation of the present disclosure, that the MAC PDU is generated for one resource grant may mean that one resource grant is selected from the first resource grant and the second resource grant first and the MAC PDU is generated for the selected resource grant.

Specifically, the resource grant may be selected according to the preset condition. Specifically, when the preset condition including at least one of the conditions 1) to 14) is met, the first resource grant may be taken as the selected resource grant. Or, in an implementation of the present disclosure, the resource grant may be selected according to the indication from the network device or the preset rule. For example, the network device or the preset rule indicates that the first resource grant is taken as the selected resource grant.

Optionally, in an implementation of the present disclosure, the selection of one resource grant from the first resource grant and the second resource grant may occur at any of the following times:

1) before the MAC PDUs are generated for the first resource grant and the second resource grant;

2) before the first resource grant and the second resource grant are indicated to the HARQ processes;

3) before the MAC PDU is generated for one of the first resource grant and the second resource grant; at this time, for another resource grant, the MAC PDU has been packed, or the MAC PDU has been indicated to the physical layer, or the MAC PDU has been transmitted.

4) before one of the first resource grant and the second resource grant is indicated to the HARQ process; at this time, for another resource grant, the MAC PDU has been indicated to the HARQ process, or the MAC PDU has been packed, or the MAC PDU has been indicated to the physical layer, or the MAC PDU has been transmitted.

5) before defined processing time is reached, for example, limited time of selecting the resource grants is set, and before this time is reached, the selection of resource grant is performed; in an implementation of the present disclosure, the processing time may also be understood as a time when the MAC PDU for one resource grant is generated; before this time is reached, the MAC PDU for one resource grant is selected to be generated, and if this time is reached or after this time, two MAC PDUs for the two resource grants are generated; and 6) when it is determined that there is overlapping section between the resource grants, or when the first resource grant and the second resource grant overlap with each other.

When the preset conditions described above are met, the first resource grant is selected from the first resource grant and the second resource grant, and the MAC PDU is encapsulated for the first resource grant.

A variety of implementation modes of selection of the resource grants will be described below.

In implementation mode A), if the first resource grant is a configured resource grant and the second resource grant is a dynamic scheduling resource grant, the first resource grant is selected.

In implementation mode B), if the first resource grant is a dynamic scheduling resource grant and the second resource grant is a configured resource grant, the first resource grant is selected.

In implementation mode C), if the first resource grant is a resource grant that arrives first and the second resource grant is a resource grant that arrives later, the first resource grant is selected.

In implementation mode D), if the first resource grant is a resource grant that arrives later and the second resource grant is a resource grant that arrives first, the first resource grant is selected.

In implementation mode E), if data (e.g., transport block size) that can be carried by the first resource grant is larger than data that can be carried by the second resource grant, then the first resource grant is selected.

In implementation mode F), if data of the target logical channel that can be carried by the first resource grant is greater than data that may be carried by the second resource grant, then the first resource grant is selected.

In implementation mode G), if the attribute of the first resource grant is stricter than the attribute of the second resource grant, the first resource grant is selected. The attribute being stricter may mean that transmission time of the resource grant is shorter, or the reliability is higher, or requirement on the logical channel that may be carried is higher (that is, less data of the logical channel may be transmitted through the first resource grant, or data of a logical channel with higher priority may be transmitted through the first resource grant). For example, the PUSCH duration of the first resource grant is shorter than the PUSCH duration of the second resource grant.

In implementation mode H), if the attribute of the first resource grant is looser than the attribute of the second resource grant, the first resource grant is selected. The attribute being looser may mean that transmission time of the resource grant is longer, the reliability is lower or requirements on the logical channel that may be carried is lower (that is, more data of the logical channel may be transmitted through the first resource grant, or data of the logical channel with higher priority may be transmitted through the first resource grant). For example, the PUSCH duration of the first resource grant is longer than the PUSCH duration of the second resource grant, and a logical priority threshold corresponding to the first resource grant is lower, so that the first resource grant may carry more data of the logical channel.

In implementation mode I), if the first resource grant can carry all data in the target logical channel, while the second resource grant cannot carry all the data in the target logical channel, then the first resource grant is selected.

In implementation mode J), if the priority of the logical channel to which the data to be carried by the first resource grant belongs is greater than the priority of the logical channel to which the data to be carried by the second resource grant belongs, then the first resource grant is selected.

In implementation mode K), if the priority of the first resource grant is greater than the priority of the second resource grant, the first resource grant is selected.

In implementation mode L), if the network device or the preset rule indicates that the first resource grant is a resource grant needs to be selected, then the first resource grant is selected.

The preset condition used by the above implementation modes for the selection of resource grants may include at least one of the condition 4), the conditions that replace the condition 6), the conditions that replace the condition 7), the conditions that replace the condition 10) and the conditions that replace the condition 12), that is, it may be determined, based on the above conditions, that the MAC PDU needs to be generated for one resource grant, and the resource grant, which is required for generation of the MAC PDU, is selected based on the above implementation modes A)-L).

In an implementation of the present disclosure, when selecting a resource grant from the first resource grant and the second resource grant, the time when the MAC PDUs are packed for the first resource grant and the second resource grant, and their packing order may not need to be considered.

It should be understood that, in the implementation of the present disclosure, the above implementation modes A)-L) for selecting the first resource grant may be used in combination with the above preset conditions 1)-14), or they may exist independently, that is, only the above preset conditions exist without the selection modes, or only the selection modes exist without the above preset conditions.

Inane implementation of the present disclosure, whether the MAC PDUs are generated for both of or one of the first resource grant and the second resource grant may be determined after one of the MAC PDUs has been generated, or before any one of the two MAC PDUs are generated.

Optionally, in an implementation of the present disclosure, whether to generate the MAC PDU or not may be determined for the first resource grant and whether to generate the MAC PDU or not may be determined for the second resource grant.

In the above, whether to generate the MAC PDUs or not may be determined for the first resource grant based on the attribute of the first resource grant without considering the attribute of the second resource grant.

For example, it may be determined whether the first resource grant matches with the LCP mapping limit configured for the target logical channel, whether the attribute of the first resource grant meets the transmission configuration of the target logical channel, whether the logical channel to which the data to be carried by the first resource grant belongs is a target logical channel, whether the priority of the first resource grant is greater than a specific priority, whether the priority of the logical channel to which the data to be carried by the first resource grant belongs is higher than a specific priority, whether the identifier of the logical channel to which the data to be carried by the first resource grant belongs is a specific identifier, and whether there is the target logical channel. If yes, the MAC PDUs may be generated based on the first resource grant. It should be understood that one of the conditions here may be selected, or more conditions may exist.

For example, it may be determined whether the second resource grant matches with the LCP mapping limit configured for the target logical channel, whether the attribute of the second resource grant meets the transmission configuration of the target logical channel, whether the logical channel to which the data to be carried by the second resource grant belongs is a target logical channel, whether the priority of the second resource grant is greater than a specific priority, whether the priority of the logical channel to which the data to be carried by the second resource grant belongs is higher than a specific priority, whether the identifier of the logical channel to which the data to be carried by the second resource grant belongs is a specific identifier, and whether there is the target logical channel. If yes, the MAC PDUs may be generated based on the first resource grant. It should be understood that one of the conditions here may be selected, or more conditions may exist.

It has been described above that the MAC PDU may be generated for one of the first resource grant and the second resource grant respectively in the case that there is the overlapping section between the first resource grant and the second resource grant. The implementation of the present disclosure may be applicable to a case where more than two resource grants overlap in resources, at which time the MAC PDUs may be generated for part (e.g., the first resource grant or the second resource grant) of the more than two resource grants.

Optionally, in an implementation of the present disclosure, the condition that there is the overlapping section between the first resource grant and the second resource grant is set forth above, but implementations of the present disclosure are not limited thereto.

For example, the first resource grant and/or the second resource grant may be replaced with resource(s) occupied by a Scheduling Request (SR), and the logical channel to which the data to be carried by the first resource grant or the second resource grant belongs may be a logical channel that trigger the scheduling request (i.e., the logical channel of the data to be transmitted, the target logical channel, and a logical channels indicated by the SR).

For example, the first resource grant and/or the second resource grant may be replaced with resource(s) occupied by a Physical Uplink Control Channel (PUCCH), and the logical channel to which the data to be carried by the first resource grant or the second resource grant belongs may be replaced with a logical channel to which data for control information (e.g., feedback information, SR information and CSI-RS information) carried by the PUCCH belongs.

Specifically, the implementation of the present disclosure may be applicable to a case where a resource occupied by a SR overlaps with a resource grant, a case where a resource occupied by one SR overlap with a resource occupied by another SR, a case where a resources occupied by a SR overlaps with a resource occupied by a PUCCH, a case where a resource grant overlaps with resources occupied by the PUCCHs, and a case where a case where a resource occupied by one PUCCH overlaps with a resource occupied by another PUCCH.

For example, the resource occupied by the SR overlap with the resource occupied by the PUSCH (which may be a resource grant in the implementation of the present disclosure), and if a priority of a logical channel triggering the SR is higher than a threshold, it is indicated that a physical layer sends the SR and the PUSCH is not indicated. For another example, the resource occupied by the SR overlaps with the resource occupied by the PUSCH, and if the priority of the logical channel triggering the SR is higher than the threshold and a priority of a logical channel carried by the PUSCH is higher than the threshold, it is indicated that the physical layer sends the SR and the PUSCH is not indicated. For example, the resource occupied by the SR overlaps with the resource occupied by the PUSCH, and if a priority of a logical channel contained in the PUSCH is higher than the threshold, it is indicated that the physical layer sends the PUSCH and the SR is not indicated. Combination modes thereof are not limited.

It should be understood that the above-mentioned methods may be used in combination. For example, the method 1400 may be used in combination with the method 1500.

For example, the explanation of terms in each method may be applied to other methods.

For example, in an implementation of the present disclosure, when there is the overlapping section between first resource grant and the second resource grant, it may be determined whether the MAC PDUs are generated for both of or one of the resource grants. Specifically, whether the two MAC PDUs are generated for one or both of the resource grants may be implemented with reference to the descriptions on methods 1400 and 1500 respectively, and how to select one resource grant from the two resource grants may be implemented with reference to the description on method 1500.

The communication methods according to implementations of the present disclosure have been described in detail above, and communication devices according to implementations of the present disclosure will be described below in combination with FIGS. 9 to 17. The technical features described in the method implementations are applicable to the following device implementations.

Figure 9:
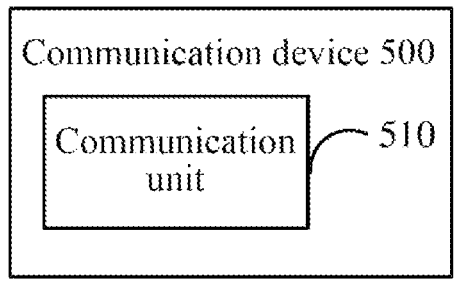
FIG. 9 is a schematic block diagram of a communication device according to an implementation of the present disclosure.

FIG. 9 shows a schematic block diagram of a communication device 500 according to an implementation of the present disclosure. As shown in FIG. 9, the communication device 500 includes:

a communication unit 510 configured to, transmit or receive data in the overlapping section using the second resource grant if there is an overlapping section between a first resource grant and a second resource grant; wherein the first resource grant is a dynamic scheduling resource grant, and the second resource grant is a configured resource grant.

Optionally, in an implementation of the present disclosure, the communication unit 510 is specifically configured to transmit or receive the data in the overlapping section using the second resource grant in the case that a preset condition is met if there is the overlapping section between the first resource grant and the second resource grant.

Optionally, in an implementation of the present disclosure, the preset condition includes at least one of:

a first condition about an attribute of the second resource grant, a second condition for that a logical channel to be transmitted meets the second resource grant, a third condition for that the second resource grant is used for retransmission or initial transmission, a fourth condition about a configured grant timer for a hybrid automatic repeat request (HARQ) process of the second resource grant, a fifth condition for that the first resource grant is used for retransmission or initial transmission, a sixth condition about an attribute of the logical channel to be transmitted, and a seventh condition about service data existing in an MAC PDU in the hybrid automatic repeat request (HARQ) process of the second resource grant.

Optionally, in an implementation of the present disclosure, the first condition includes at least one of:
that a subcarrier spacing of the second resource grant meets a set subcarrier spacing list;
that transmission duration of a physical shared channel of the second resource grant meets a set allowed maximum transmission duration of the physical shared channel;
that a type of the second resource grant is a specific type;
that a serving cell applied by the second resource grant is an allowed serving cell for transmission;
that a modulation and coding scheme (MCS) table applied by the second resource grant meets a set MCS table list;
that an MCS table applied by the second resource grant for transmission precoding meets a set MCS table list;
that uplink control information (UCI) applied by the second resource grant for transmission of a physical shared channel meets a set condition;
that the number of times of repeated transmission applied by the second resource grant meets a set condition;
that a redundant transmission version number of repeated transmission applied by the second resource grant meets a set condition;
that a transmission period applied by the second resource grant meets a set condition;
that a configured grant timer applied by the second resource grant meets a set condition;
that a modulation order, code rate and corresponding transmission block size applied by the second resource grant meet a certain condition;
that a parameter of the configuration grant applied by the second resource grant meets a set condition;
that semi-persistent scheduling (SPS) configuration applied by the second resource grant meets a set condition;
that indication information applied by the second resource grant is indication information for ultra reliable & low latency communication (URLLC) services;
that a logical channel priority limit of the second resource grant matches with a specific service or a specific logical channel;
that a priority of the logical channel applied by the second resource grant matches with a specific service or a specific logical channel; and
that the second resource grant is a resource grant with a specific priority or a resource grant with a specific identifier.

Optionally, in an implementation of the present disclosure, the second condition includes at least one of:
that the subcarrier spacing usable by the logical channel belongs to a subcarrier spacing list, which corresponds to the second resource grant;
that the transmission duration of the physical shared channel usable by the logical channel meets an allowed maximum transmission duration of the physical shared channel, wherein the allowed maximum transmission duration corresponds to the second resource grant;
that the type of the resources usable by the logical channels conforms to a specific type, wherein the specific type corresponds to the second resource grant;
that the serving cell usable by the logical channels conforms to an allowed serving cell for transmission, wherein the allowed serving cell for transmission corresponds to the second resource grant;
that the logical channel carries an indication identifier containing a specific service, which is a service for the second resource grant;

that the MCS table usable by the logical channel meets a set MCS table list, which corresponds to the second resource grant;

that the MCS table usable by the logical channel for transmission precoding meets a set MCS table list, which corresponds to the second resource grant;

that the uplink control information (UCI) usable by the logical channel for transmission of physical shared channel meets a set condition, which corresponds to the second resource grant;

that the number of times of repeated transmission usable by the logical channel meets a set condition, which corresponds to the second resource grant;

that the redundant transmission version number of repeated transmission usable by the logical channel meets a set condition, which corresponds to the second resource grant;

that the transmission period usable by the logical channel meets a set condition, which corresponds to the second resource grant;

that the configured grant timer usable by the logical channel meets a set condition, which corresponds to the second resource grant;

that the modulation order, code rate and corresponding transmission block size usable by the logical channel meet a set condition, which corresponds to the second resource grant;

that the parameter of the configuration grant usable by the logical channel meets a set condition, which corresponds to the second resource grant; and that the SPS configuration usable by the logical channel meets a set condition, which corresponds to the second resource grant.

Optionally, in an implementation of the present disclosure, the third condition includes that the second resource grant is used for retransmission.

Optionally, in an implementation of the present disclosure, the fourth condition includes that the configured grant timer for the HARQ process of the second grant resource is running.

Optionally, in an implementation of the present disclosure, the fifth condition includes that the first resource grant is used for initial transmission or retransmission.

Optionally, in an implementation of the present disclosure, the sixth condition includes at least one of: that the logical channel carries an indication identifier containing a specific service and the logical channel is configured to carry a logical channel identifier (ID) of a specific service; that the priority of the logical channel is a specific priority; that a priority of the logical channel group to which the logical channel belongs is a specific priority; that an identifier of the logical channel group to which the logical channel belongs is a specific identifier; that a priority of a logical channel group to which the logical channels belongs is a specific priority; that the logical channel has a service to be transmitted; that the logical channel group to which the logical channels belongs has a service to be transmitted; that the logical channels has a specific service to be transmitted; that the logical channel group to which the logical channel belongs has a specific service to be transmitted. The specific service may be a URLLC service or a service with higher reliability and lower latency than services transmitted by the first resources grant.

Optionally, in an implementation of the present disclosure, the logical channel is a logical channel carried on an uplink resource.

Optionally, in an implementation of the present disclosure, the seventh condition includes that the MAC PDU in the HARQ process for the second resource grant contains a specific service or contains data of a logical channel ID corresponding to the specific service. The specific service may be a URLLC service or a service with higher reliability and lower latency than the services transmitted by the first resources grant.

Optionally, in an implementation of the present disclosure, the first resource grant is scrambled by C-RNTI, TC-RNTI or CS-RNTI; or the first resource grant is carried in a random access response.

Optionally, in an implementation of the present disclosure, the first resource grant is used for transmitting or receiving enhance mobile broadband (eMBB) services, and the second resource grant is used for transmitting or receiving URLLC services.

Optionally, in an implementation of the present disclosure, the first resource grant is used for transmitting or receiving retransmitted data of URLLC services with low priority, and the second resource grant is used for transmitting or receiving initially transmitted data of URLLC services with high priority.

Optionally, in an implementation of the present disclosure, the first resource grant is used for transmitting or receiving retransmitted data of semi-statically transmitted services, and the second resource grant is used for transmitting or receiving initially transmitted data of URLLC services.

Optionally, in an implementation of the present disclosure, the communication unit 510 is specifically configured to flip the new data indication (NDI) and transmit or receive the data of the first services on the second resource grant in case that the logical channel to be transmitted contains a first service and the configured grant timer of the HARQ process corresponding to the second service with lower priority than the first service is running, wherein the first service and the second service correspond to the same HARQ process.

Optionally, in an implementation of the present disclosure, the communication unit 510 is specifically configured to transmit or receive the data which is preset to be transmitted or received using the second resource grant, using the second resource grant when there is data preset to be transmitted or received using the second resource grant.

Optionally, in an implementation of the present disclosure, a HARQ process number corresponding to the first resource grant is the same as a HARQ process number corresponding to the second resource grant.

Optionally, in an implementation of the present disclosure, the HARQ process number corresponding to the first resource grant is different from the HARQ process number corresponding to the second resource grant.

Optionally, in an implementation of the present disclosure, the communication device 500 further includes a processing unit 520 configured to discard the first resource grant.

Optionally, in an implementation of the present disclosure, the communication unit 510 is further configured to transmit or receive a service corresponding to the first resource grant using a resource in a section where the first resource grant does not overlap with the second resource grant.

Optionally, in an implementation of the present disclosure, that there is an overlapping section between the first resource grant and the second resource grant means that there is an overlapping section between the first resource grant and the second resource grant in the time domain.

It should be understood that the communication device 500 may correspond to the communication device in the method 200, and may implement the corresponding operations of the communication device in the method 200, which will not be repeated here for brevity.

Figure 10:
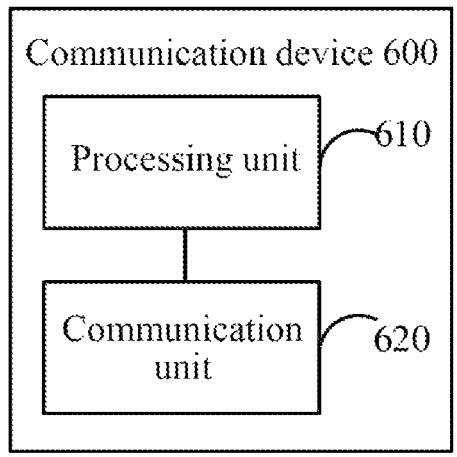
FIG. 10 is a schematic block diagram of a communication device according to an implementation of the present disclosure.

FIG. 10 shows a schematic block diagram of a communication device 600 according to an implementation of the present disclosure. As shown in FIG. 10, the communication device 600 includes:

a processing unit 610 configured to flip a new data indication (NDI) in case that a first service is contained in a logical channel to be transmitted and a configured grant timer corresponding to a second services with a lower priority than the first service is running; and a communication unit 620 configured to transmit or receive data of the first service on a resource grant, wherein the first service and the second service correspond to the same HARQ process.

Optionally, in an implementation of the present disclosure, the resource grant is a configured resource grant.

Optionally, in an implementation of the present disclosure, the first service and the second service are URLLC services; or the first service is a URLLC service, and the second service is a semi-static transmission service.

It should be understood that the communication device 600 may correspond to the communication device in the method 300, and may implement the corresponding operations of the communication device in the method 300, which will not be repeated here for brevity.

Figure 11:
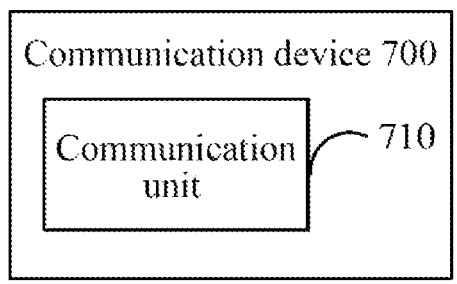
FIG. 11 is a schematic block diagram of a communication device according to an implementation of the present disclosure.

FIG. 11 shows a schematic block diagram of a communication device 700 according to an implementation of the present disclosure. As shown in FIG. 11, the communication device 700 includes:

a communication unit 710 configured to transmit or receive a first service using a second resource grant in case that there is the first service preset to be transmitted using the first resource grant and the second resource grant exists;

wherein the first resource grant is a dynamic scheduling resource grant, and the second resource grant is a configured resource grant.

Optionally, in an implementation of the present disclosure, there is currently no first resource grant used for transmitting the first services.

Optionally, in an implementation of the present disclosure, there is currently no data of the second service that is preset to be transmitted using the second resource grant.

Optionally, in an implementation of the present disclosure, the communication device further includes a processing unit 720 configured to not start a configured grant timer corresponding to the second resource grant.

It should be understood that the communication device 700 may correspond to the communication device in the method 400, and may implement the corresponding operations of the communication device in the method 400, which will not be repeated here for brevity.

Figure 12:
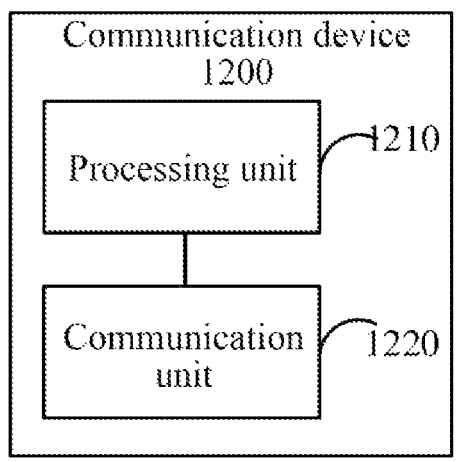
FIG. 12 is a schematic block diagram of a communication device according to an implementation of the present disclosure.

FIG. 12 is a schematic block diagram of a communication device 1200 according to an implementation of the present disclosure. The communication device 1200 includes a processing unit 1210 and a communication unit 1220.

The processing unit 1210 is configured to determine at least one logical channel according to a first radio network temporary identifier (RNTI) used by a resource grant; and generate a media access control (MAC) protocol data unit (PDU) according to data in the at least one logical channel.

The communication unit 1220 is configured to send the MAC PDU on a resource indicated by the resource grant.

Optionally, in an implementation of the present disclosure, the processing unit 1210 is further configured to:

determine a service type to be transmitted according to the first RNTI; and determine the at least one logical channel according to the service type to be transmitted.

Optionally, in an implementation of the present disclosure, the processing unit 1210 is further configured to:

determine the service type to be transmitted according to the first RNTI and a correspondence between RNTIs and service types.

Optionally, in an implementation of the present disclosure, the correspondence is configured through a radio resource control (RRC) signaling.

Optionally, in an implementation of the present disclosure, the service type to be transmitted includes vehicle network service.

Optionally, in an implementation of the present disclosure, the service type to be transmitted includes industry network service.

Optionally, in an implementation of the present disclosure, the processing unit 1210 is further configured to:

determine the at least one logical channel according to the first RNTI and the RNTI used by the resource grant that each logical channel is allowed to use.

Optionally, in an implementation of the present disclosure, the RNTI used by the resource grant that each logical channel is allowed to use is configured through the RRC signaling.

Optionally, in an implementation of the present disclosure, the resource grant is used for newly transmitting data.

It should be understood that the communication device 1200 may correspond to the communication device in the method 1000, and may implement the corresponding operations of the communication device in the method 1000, which will not be repeated here for brevity.

Figure 13:
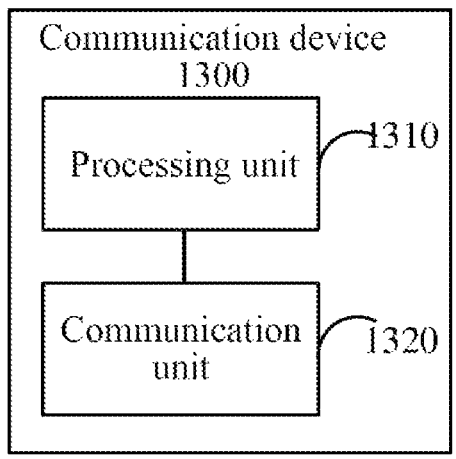
FIG. 13 is a schematic block diagram of a communication device according to an implementation of the present disclosure.

FIG. 13 is a schematic block diagram of a communication device 1300 according to an implementation of the present disclosure. The communication device 1300 includes a communication unit 1310 and a processing unit 1320.

The communication unit 1310 is configured to obtain a media access control (MAC) protocol data unit (PDU) on a resource indicated by a resource grant.

The processing unit 1320 is configured to determine at least one logical channel, to which data for generating the MAC PDU belongs, according to a first radio network temporary identifier (RNTI) used by the resource grant.

Optionally, in an implementation of the present disclosure, the processing unit 1320 is further configured to:

determine a service type to which the MAC PDU belongs according to the first RNTI; and determine the at least one logical channel according to the service type to which the MAC PDU belongs.

Optionally, in an implementation of the present disclosure, the processing unit 1320 is further configured to:

determine the service type to which the MAC PDU belongs according to the first RNTI and a correspondence between RNTIs and service types.

Optionally, in an implementation of the present disclosure, the correspondence is configured through a RRC signaling.

Optionally, in an implementation of the present disclosure, a service indicated by the service type to which the MAC PDU belongs include vehicle network service.

Optionally, in an implementation of the present disclosure, a service indicated by the service type to which the MAC PDU belongs include industry network service.

Optionally, in an implementation of the present disclosure, the processing unit 1320 is further configured to:

determine the at least one logical channel according to the first RNTI and the RNTI used by the resource grant that each logical channel is allowed to use.

Optionally, in an implementation of the present disclosure, the RNTI used by the resource grant that each logical channel is allowed to use is configured through the RRC signaling. Optionally, in an implementation of the present disclosure, the resource grant is used for newly transmitting data.

It should be understood that the communication device 1300 may correspond to the communication device in the method 1100, and may implement the corresponding operations of the communication device in the method 1100, which will not be repeated here for brevity.

Figure 14:
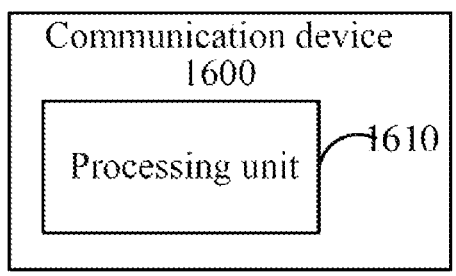
FIG. 14 is a schematic block diagram of a communication device according to an implementation of the present disclosure.

FIG. 14 is a schematic block diagram of a communication device 1600 according to an implementation of the present disclosure. As shown in FIG. 14, the communication device 1600 may include a processing unit 1610.

The processing unit 1610 is configured to:

generate a first MAC PDU for a first resource grant; and generating a second MAC PDU for a second resource grant, wherein there is an overlapping section between the first resource grant and the second resource grant.

Optionally, in an implementation of the present disclosure, generation time of the first MAC PDU is earlier than generation time of the second MAC PDU.

Optionally, in an implementation of the present disclosure, the processing unit 1610 is further configured to:

generate the second MAC PDU for the second resource grant when a preset condition is met.

Optionally, in an implementation of the present disclosure, the preset condition may be a condition about at least one of:

a hybrid automatic repeat request (HARQ) process of the first resource grant, a HARQ process of the second resource grant; a priority of the first resource grant; a priority of the second resource grant; an attribute of the first resource grant, an attribute of the second resource grant, a logical channel to which data to be contained in the first MAC PDU belongs, a logical channel to which data to be contained in the second MAC PDU belongs, and whether there is a target logical channel.

Optionally, in an implementation of the present disclosure, the preset condition includes at least one of:

that the HARQ process of the first resource grant is different from the HARQ process of the second resource grant;

that the priority of the second resource grant is higher than the priority of the first resource grant;

that the second resource grant matches with an LCP mapping limit configured for the target logical channel;

that the attribute of the second resource grant meets transmission configuration of the target logical channel;

that data to be carried in the second MAC PDU belongs to the target logical channel;

that the logical channel to which the data to be contained in the first MAC PDU belongs do not belong to the target logical channel;

that a priority of the logical channel to which the data to be contained in the first MAC PDU belongs is lower than a priority of the logical channel to which the data to be contained in the second MAC PDU belongs;

that a priority of the logical channel to which the data to be contained in the first MAC PDU belongs is lower than a priority of the target logical channel;

that the priority of the first resource grant is lower than the priority of the second resource grant;

that the first resource grant does not match with the LCP mapping limit configured for the target logical channel; and that the attribute of the first resource grant do not meet the transmission configuration of the target logical channel.

It should be understood that the communication device 1600 may be used for implementing the corresponding operations implemented by the communication device in the above method 1400, which will not be repeated here for brevity.

Figure 15:
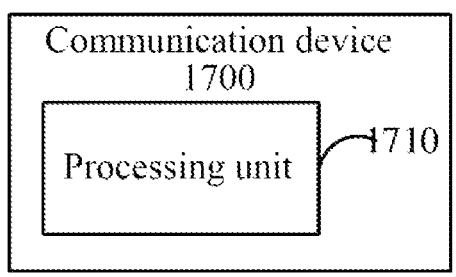
FIG. 15 is a schematic block diagram of a communication device according to an implementation of the present disclosure.

FIG. 15 is a schematic block diagram of a communication device 1700 according to an implementation of the present disclosure. As shown in FIG. 15, the communication device 1700 may include a processing unit 1710.

The processing unit 1710 is configured to:

generate a MAC PDU for one of a first resource grant and a second resource grant if there is an overlapping section between the first resource grant and the second resource grant.

Optionally, in an implementation of the present disclosure, the processing unit 1710 is further configured to:

generate the MAC PDU for one of the first resource grant and the second resource grant when a preset condition is met.

Optionally, in an implementation of the present disclosure, the preset condition is a conditions about at least one of:

a hybrid automatic repeat request (HARQ) process of the first resource grant, a HARQ process of the second resource grant, a priority of the first resource grant, a priority of the second resource grant; an attribute of the first resource grant, an attribute of the second resource grant, a logical channel to which data to be contained in the first MAC PDU belongs, a logical channels to which data to be contained in the second MAC PDU belongs, and whether there is a target logical channel.

Optionally, in an implementation of the present disclosure, the resource grant is the first resource grant;

The preset condition include at least one of:

that the first MAC PDU has been generated for the first resource grant;

that the first MAC PDU has been indicated to a physical layer;

that the first MAC PDU has been transmitted through the first resource grant;

that the HARQ process of the first resource grant is the same as the HARQ process of the second resource grant;

that the priority of the second resource grant is lower than the priority of the first resource grant;

that the second resource grant does not match with an LCP mapping limit configured for the target logical channel;

that the attribute of the second resource grant does not meet transmission configuration of the target logical channel;

that data to be carried by the second resource grant does not belong to the target logical channel;

that the logical channel to which the data to be contained in the first MAC PDU belongs do not belong to the target logical channel;

that a priority of the logical channel to which the data to be contained in the first MAC PDU belongs is higher than a priority of the logical channel to which the data to be carried by the second resource grant belongs;

that a priority of the logical channel to which the data to be contained in the first MAC PDU belongs is higher than a priority of the target logical channel;

that the priority of the first resource grant is higher than the priority of the second resource grant;

that the first resource grant matches with the LCP mapping limit configured for the target logical channel; and that the attribute of the first resource grant meets the transmission configuration of the target logical channel or target service.

Optionally, in an implementation of the present disclosure, the processing unit 1710 is further configured to:

generate the MAC PDU for one of the first resource grant and the second resource grant according to an indication of a network device or an indication of a preset rule.

Optionally, in an implementation of the present disclosure, the processing unit 1710 is further configured to:

select one resource grant from the first resource grant and the second resource grant to generate the corresponding MAC PDU before the MAC PDUs are generated for the first resource grant and the second resource grant, or before the first resource grant and the second resource grant are indicated to the HARQ processes, or before the MAC PDU is generated for one of the first resource grant and the second resource grant, or before one of the first resource grant and the second resource grant is indicated to the HARQ process, or before defined processing time is reached.

It should be understood that the communication device 1700 may be used for implementing the corresponding operations implemented by the communication device in the method 1500, which will not be repeated here for brevity.

Figure 16:
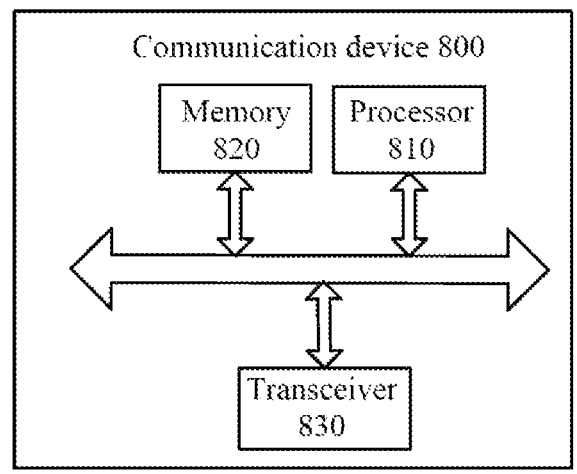
FIG. 16 is a schematic block diagram of a communication device according to an implementation of the present disclosure.

FIG. 16 is a schematic structural diagram of a communication device 800 according to an implementation of the present disclosure. The communication device 600 shown in FIG. 16 includes a processor 810, which may call and run a computer program from a memory to implement the methods according to the implementations of the present disclosure.

Optionally, as shown in FIG. 16, the communication device 800 may further include the memory 820. The processor 810 may call and run the computer program from the memory 820 to implement the methods according to the implementations of the present disclosure.

The memory 820 may be a separate device independent of the processor 810 or may be integrated in the processor 810.

Optionally, as shown in FIG. 16, the communication device 800 may further include a transceiver 830. The processor 810 may control the transceiver 830 to communicate with other devices. Specifically, the transceiver 830 may send information or data to other devices or receive information or data sent by other devices.

The transceiver 830 may include a transmitter and a receiver. The transceiver 830 may further include antennas, the number of which may be one or more.

Optionally, the communication device 800 may specifically be the communication device according to the implementations of the present disclosure, and the communication device 800 may implement the corresponding processes implemented by the communication device in various methods according to the implementations of the present disclosure, which will not be repeated here for brevity.

Figure 17:
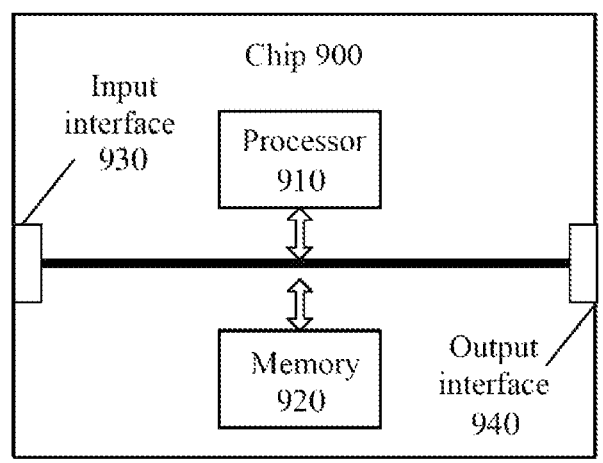
FIG. 17 is a schematic block diagram of a chip according to an implementation of the present disclosure.

FIG. 17 is a schematic structural diagram of a chip according to an implementation of the present disclosure.

The chip 900 shown in FIG. 17 includes a processor 910. The processor 910 may call and run a computer program from a memory to implement the methods according to the implementations of the present disclosure.

Optionally, as shown in FIG. 17, the chip 900 may further include the memory 920. The processor 910 may call and run the computer program from the memory 920 to implement the methods according to the implementations of the present disclosure.

The memory 920 may be a separate device independent of the processor 910 or may be integrated in the processor 910.

Optionally, the chip 900 may further include an input interface 930. The processor 910 may control the input interface 930 to communicate with other devices or chips. Specifically, the processor 910 may acquire information or data sent by other devices or chips.

Optionally, the chip 900 may further include an output interface 940. The processor 910 may control the output interface 940 to communicate with other devices or chips. Specifically, the processor 910 may output information or data to other devices or chips.

Optionally, the chip may be applied to the communication device in the implementations of the present disclosure, and the chip may implement the corresponding processes implemented by the communication device in various methods according to the implementations of the present disclosure, which will not be repeated here for brevity.

It should be understood that the chip mentioned in the implementations of the present disclosure may be referred to as a system-level chip, a system chip, a chip system or a system-on-chip, etc.

It should be understood that the processor in the implementation of the present disclosure may be an integrated circuit chip having a signal processing capability. In an implementation process, the steps of the foregoing method implementations may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or another programmable logic device, a discrete gate or a transistor logic device, or a discrete hardware component. The processor may implement or perform various methods, steps and logical block diagrams disclosed in the implementations of the present disclosure. The general purpose processor may be a microprocessor, or the processor may also be any conventional processor, or the like. The steps of the methods disclosed in combination with the implementations of the present disclosure may be directly embodied to be implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but not restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memory in the systems and methods described herein is intended to include, but not be limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memory in the implementations of the present disclosure is intended to include, but not be limited to, these and any other suitable types of memories.

An implementation of the present disclosure further provides a computer readable storage medium configured to store a computer program.

Optionally, the computer readable storage medium may be applied to the communication device in the implementations of the present disclosure, and the computer program causes a computer to perform the corresponding processes implemented by the communication device in various methods according to the implementations of the present disclosure, which will not be described repeatedly for brevity.

An implementation of the present disclosure further provides a computer program product including computer program instructions.

Optionally, the computer program product may be applied to the communication device in the implementations of the present disclosure, and the computer program instructions cause a computer to perform the corresponding processes implemented by the communication device in various methods according to the implementations of the present disclosure, which will not be described repeatedly for brevity.

An implementation of the present disclosure further provides a computer program.

Optionally, the computer program may be applied to the communication device in the implementations of the present disclosure. The computer program, when running on a computer, causes the computer to perform the corresponding processes implemented by the communication device in various methods according to the implementations of the present disclosure, which will not be described repeatedly for brevity.

A person of ordinary skill in the art may recognize that the elements and algorithm steps in various examples described in combination with the implementations disclosed herein may be implemented in electronic hardware, or a combination of computer software and electronic hardware. Whether these functions are implemented in hardware or software depends on the specific application and design constraints of the technical scheme. Skilled artisans may use various methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in other ways. For example, the device implementations described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, devices or units, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if implemented in a form of software functional unit and sold or used as an independent product, may be stored in a computer readable storage medium. Based on such understanding, the technical scheme of the present disclosure, in essence, or the part contributing to the prior art, or the part of the technical solution, may be embodied in the form of a software product, which is stored in a storage medium, and includes several instructions for causing a computer device (which may be a personal computer, a server, or a network device, etc.) to perform all or part of the steps of various implementations of the present disclosure. The aforementioned storage medium includes various media, such as a U disk, a mobile hard disk, a read-only memory (ROM), a random access memory (RAM), a magnetic disk, or an optical disk, which are capable of storing program codes What are described above are merely example implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be subject to the protection scope of the claims.

What is claimed is:

1. A wireless communication method, comprising:
when there is an overlapping section between a first resource grant and a second resource grant, transmitting or receiving data in the overlapping section using the second resource grant;
wherein the first resource grant is a dynamic scheduling resource grant, and the second resource grant is a configured resource grant;

wherein when there is the overlapping section between a first resource grant and a second resource grant, transmitting or receiving the data in the overlapping section using the second resource grant comprises: when there is the overlapping section between the first resource grant and the second resource grant, and in case that a preset condition is met, transmitting or receiving the data in the overlapping section using the second resource grant;

wherein the preset condition comprises a sixth condition about an attribute of the logical channel, wherein the sixth condition comprises at least one of: that the logical channel has a specific service to be transmitted; that the priority of the logical channel group to which the logical channel belongs is a specific priority.

2. The method according to claim 1, wherein the preset condition further comprises at least one of:

a first condition about an attribute of the second resource grant, a second condition for that a logical channel to be transmitted meets the second resource grant, a third condition for that the second resource grant is used for retransmission or initial transmission, a fourth condition about a configured grant timer for a hybrid automatic repeat request (HARQ) process of the second resource grant, a fifth condition for that the first resource grant is used for retransmission or initial transmission, and a seventh condition about service data existing in an MAC PDU in the hybrid automatic repeat request (HARQ) process of the second resource grant.

3. The method according to claim 2, wherein the first condition comprises at least one of:

that a subcarrier spacing of the second resource grant meets a set subcarrier spacing list;

that transmission duration of a physical shared channel of the second resource grant meets a set allowed maximum transmission duration of the physical shared channel;

that a type of the second resource grant is a specific type;

that a serving cell applied by the second resource grant is an allowed serving cell for transmission;

that a modulation and coding scheme (MCS) table applied by the second resource grant meets a set MCS table list;

that an MCS table applied by the second resource grant for transmission precoding meets a set MCS table list;

that uplink control information (UCI) applied by the second resource grant for transmission of a physical shared channel meets a set condition;

that the number of times of repeated transmission applied by the second resource grant meets a set condition;

that a redundant transmission version number of repeated transmission applied by the second resource grant meets a set condition;

that a transmission period applied by the second resource grant meets a set condition;

that a configured grant timer applied by the second resource grant meets a set condition;

that a modulation order, code rate and corresponding transmission block size applied by the second resource grant meet a certain condition;

that a parameter of the configuration grant applied by the second resource grant meets a set condition;

that semi-persistent scheduling (SPS) configuration applied by the second resource grant meets a set condition;

that indication information applied by the second resource grant is indication information for a ultra reliable & low latency communication (URLLC) service.

4. The method according to claim 2, wherein the first condition comprises at least one of:

that a logical channel priority limit of the second resource grant matches with a specific service or a specific logical channel;

that a priority of the logical channel applied by the second resource grant matches with the specific service or the specific logical channel; and that the second resource grant is a resource grant with a specific priority or a resource grant with a specific identifier.

5. The method according to claim 2, wherein the second condition comprises at least one of:

that a subcarrier spacing usable by the logical channel belongs to the subcarrier spacing list, which corresponds to the second resource grant;

that a transmission duration of the physical shared channel usable by the logical channel meets an allowed maximum transmission duration of the physical shared channel, wherein the allowed maximum transmission duration corresponds to the second resource grant;

that a type of a resource usable by the logical channel conforms to the specific type, which corresponds to the second resource grant;

that a serving cell usable by the logical channel conforms to the allowed serving cell for transmission, which corresponds to the second resource grant;

the logic channel carries an indication identifier that a ultra reliable & low latency communication (URLLC) service is contained;

that the logical channel carries an indication identifier that a specific service is contained, which is a service for the second resource grant;

that a MCS table usable by the logical channels meets a set MCS table list, which corresponds to the second resource grant;

that a MCS table usable by the logical channel for transmission precoding meets the set MCS table list, which corresponds to the second resource grant;

that uplink control information (UCI) for transmission of the physical shared channel usable by the logical channel meets a set condition, which corresponds to the second resource grant;

that the number of times of repeated transmission usable by the logical channel meets a set condition, which corresponds to the second resource grant;

that the redundant transmission version number of repeated transmission usable by the logical channels meets a set condition, which corresponds to the second resource grant;

that a transmission period usable by the logical channels meet a set condition, which corresponds to the second resource grant;

that a configured grant timer usable by the logical channel meets a set condition, which corresponds to the second resource grant;

that a modulation order, code rate and corresponding transmission block size usable by the logical channel meet a set condition, which corresponds to the second resource grant;

that a parameter of the configuration grant usable by the logical channel meets a set condition, which corresponds to the second resource grant; and that an SPS configuration usable by the logical channel meets a set condition, which corresponds to the second resource grant.

6. The method according to claim 2, wherein the third condition comprises that the second resource grant is used for retransmission.

7. The method according to claim 2, wherein the sixth condition further comprises at least one of: that an identifier of a logical channel group to which the logical channel belongs is a specific identifier; that the logical channel has a service to be transmitted; that the logical channel group to which the logical channel belongs has the service to be transmitted; that the logical channel group to which the logical channel belongs has the specific service to be transmitted; that the priority of the logical channel is a specific priority.

8. The method according to claim 1, further comprising: discarding the first resource grant.

9. A communication device comprising a processor, a memory, and a transceiver, wherein the memory is configured to computer program, the transceiver is configured to communicate with other devices under control of the processor, and the processor is configured to perform the computer program in the memory to:
when there is an overlapping section between a first resource grant and a second resource grant, control the transceiver to transmit or receive data in the overlapping section using the second resource grant;
wherein the first resource grant is a dynamic scheduling resource grant, and the second resource grant is a configured resource grant;
wherein the processor is configured to perform the computer program in the memory to, control the transceiver to transmit or receive the data in the overlapping section using the second resource grant in case that a preset condition is met when there is the overlapping section between the first resource grant and the second resource grant;
wherein the preset condition comprises a sixth condition about an attribute of the logical channel, the sixth condition comprises at least one of: that the logical channel has a specific service to be transmitted; that the priority of the logical channel group to which the logical channel belongs is a specific priority.

10. The communication device according to claim 9, wherein the preset condition further comprises a first condition about an attribute of the second resource grant, and the first condition comprises at least one of:
that a logical channel priority limit of the second resource grant matches with a specific service or a specific logical channel;
that a priority of the logical channel applied by the second resource grant matches with the specific service or the specific logical channel; and
that the second resource grant is a resource grant with a specific priority or a resource grant with a specific identifier.

11. The communication device according to claim 9, wherein the sixth condition further comprises at least one of: that an identifier of a logical channel group to which the logical channel belongs is a specific identifier; that a priority of the logical channel group to which the logical channel belongs is a specific priority; that the logical channel has a service to be transmitted; that the logical channel group to which the logical channel belongs has the service to be transmitted; that the logical channel group to which the logical channel belongs has the specific service to be transmitted; that the priority of the logical channel is the specific priority.

12. The communication device according to claim 9, the processor is configured to perform the computer program in the memory to:
discard the first resource grant.

13. A wireless communication method comprising:
when there is an overlapping section between the first resource grant and the second resource grant, generating a media access control (MAC) protocol data unit (PDU) for one of a first resource grant and a second resource grant when a preset condition is met;
wherein the preset condition comprises a condition about at least one of: a hybrid automatic repeat request (HARQ) process of the first resource grant, a HARQ process of the second resource grant, a priority of the first resource grant, a priority of the second resource grant an attribute of the first resource grant, an attribute of the second resource grant.

14. The method according to claim 13, wherein the preset condition further comprises a condition about at least one of:
a logical channel to which data to be contained in the first MAC PDU belongs, a logical channel to which data to be contained in the second MAC PDU belongs, and whether there is a target logical channel.

15. The method according to claim 13, wherein generating the MAC PDU for one of the first resource grant and the second resource grant comprises:
generating the MAC PDU for one of the first resource grant and the second resource grant according to an indication of a network device or an indication of a preset rule.

16. A communication device comprising a processor, a memory, and a transceiver, wherein the memory is configured to computer program, the transceiver is configured to communicate with other devices under control of the processor, and the processor is configured to perform the computer program in the memory to:
generate a MAC PDU for one of a first resource grant and a second resource grant when there is an overlapping section between the first resource grant and the second resource grant when a preset condition is met;
wherein the preset condition comprises a condition about at least one of: a hybrid automatic repeat request (HARQ) process of the first resource grant, a HARQ process of the second resource grant, a priority of the first resource grant, a priority of the second resource grant an attribute of the first resource grant, an attribute of the second resource grant.

17. The communication device according to claim 16, wherein the preset condition further comprises a condition about at least one of:
a logical channel to which data to be contained in the first MAC PDU belongs, a logical channel to which data to be contained in the second MAC PDU belongs, and whether there is a target logical channel.

18. The communication device according to claim 16, wherein the processor is configured to perform the computer program in the memory to:
generate the MAC PDU for one of the first resource grant and the second resource grant according to an indication of a network device or an indication of a preset rule.

* * * * *